United States Patent
Hirose et al.

(10) Patent No.: US 10,759,478 B2
(45) Date of Patent: Sep. 1, 2020

(54) STRUCTURAL MEMBER AND VEHICLE

(71) Applicant: NIPPON STEEL & SUMITOMO METAL CORPORATION, Tokyo (JP)

(72) Inventors: Satoshi Hirose, Tokyo (JP); Yuichi Ishimori, Tokyo (JP); Hiroshi Fukuchi, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 57 days.

(21) Appl. No.: 15/765,543

(22) PCT Filed: Oct. 11, 2016

(86) PCT No.: PCT/JP2016/080113
§ 371 (c)(1),
(2) Date: Apr. 3, 2018

(87) PCT Pub. No.: WO2017/061631
PCT Pub. Date: Apr. 13, 2017

(65) Prior Publication Data
US 2018/0304927 A1 Oct. 25, 2018

(30) Foreign Application Priority Data
Oct. 9, 2015 (JP) .................. 2015-200974

(51) Int. Cl.
*B62D 21/15* (2006.01)
*B62D 25/20* (2006.01)
(Continued)

(52) U.S. Cl.
CPC ............. *B62D 21/15* (2013.01); *B62D 25/00* (2013.01); *B62D 25/20* (2013.01); *B60J 5/00* (2013.01);
(Continued)

(58) Field of Classification Search
CPC ...... B62D 21/157; B62D 21/15; B62D 25/20; B62D 25/00; B62D 25/04; B62D 25/06; B60J 5/00; B60R 19/04
(Continued)

(56) References Cited

U.S. PATENT DOCUMENTS 6,702,368 B1 * 3/2004 Hanyu ................ B62D 25/04
296/193.05
2007/0001483 A1 1/2007 Uchida et al.
(Continued)

FOREIGN PATENT DOCUMENTS

| CN | 103921850 | 7/2014 |
|---|---|---|
| JP | 07-119892 | 5/1995 |

(Continued)

*Primary Examiner* — Joseph D. Pape
*Assistant Examiner* — Dana D Ivey
(74) *Attorney, Agent, or Firm* — Clark & Brody LP

(57) ABSTRACT

A structural member (10) includes: a hat member (1); and a closing plate (2). The hat member (1) includes: a top-surface portion (1a); a pair of side walls (1b) extending from both edges of the top-surface portion (1a); and flanges (1c). The closing plate (2) is in contact with the flanges (1c). Each of the side walls (1b) includes a low-strength portion (1s) extending from one edge of the side wall (1b) to a position at a distance Sh. The distance Sh is 20 to 40% of the height H of the side wall (1b). The yield strength of the low-strength portion (1s) is 60 to 85% of the yield strength of the side wall (1b) as measured at a position (1mid) of one-half of the height of the side wall (1b).

5 Claims, 34 Drawing Sheets

(51) Int. Cl.
*B62D 25/00* (2006.01)
*B62D 25/04* (2006.01)
*B60J 5/00* (2006.01)
*B60R 19/04* (2006.01)

(52) U.S. Cl.
CPC ............ *B60R 19/04* (2013.01); *B62D 21/157* (2013.01); *B62D 25/04* (2013.01)

(58) Field of Classification Search
USPC .......................... 296/187.12, 187.01, 193.06
See application file for complete search history.

(56) References Cited

U.S. PATENT DOCUMENTS

2015/0274218 A1    10/2015   Takagi et al.
2017/0292169 A1*   10/2017   Cazes ................. C21D 9/0068

FOREIGN PATENT DOCUMENTS

| JP | 2004-114912 | 4/2004 |
|---|---|---|
| JP | 2008-265609 | 11/2008 |
| JP | 2010-236560 | 10/2010 |
| JP | 5137322 | 2/2013 |
| JP | 2014-024074 | 2/2014 |
| JP | 2015-020476 | 2/2015 |
| JP | 5906324 | 4/2016 |
| WO | 2005/058624 | 6/2005 |
| WO | 2016/046228 | 3/2016 |

\* cited by examiner

STRUCTURAL MEMBER AND VEHICLE

TECHNICAL FIELD

The present invention relates to an impact-resistant structural member and a vehicle using the same.

BACKGROUND ART

Structural members used as reinforcement members for vehicles are required to have high strength and light weight. For example, WO 2005/058624 (Patent Document 1) discloses a metal pipe to be attached to the vehicle body of an automobile for impact resistance, where both ends of the pipe are supported. This metal pipe includes a bend along its entire length or along a portion of it. The metal pipe is disposed such that the direction in which the outer periphery of the bend faces is generally aligned with the direction of impacts that can be applied to the vehicle body. The metal pipe has an improved impact resistance for vehicle-body reinforcement over reinforcement members using straight pipes.

PRIOR ART DOCUMENTS

Patent Documents

Patent Document 1: WO 2005/058624

SUMMARY OF THE INVENTION

Problems to be Solved by the Invention

Typically, when the wall thickness of a structural member is to be reduced to reduce its weight, its strength is increased. When the structural member receives an impact that is above its yield strength, it bends sharply such that the bend protrudes. If the wall thickness of the structural member is reduced, the extension of the protrusion accompanied by a bend under an impact tends to be large. Meanwhile, if a structural member is to be used in a vehicle, for example, it is preferable that, when an impact due to a crash deforms the structural member, the extension of the protrusion accompanied by the resulting bend of the structural member is small, because a large protrusion at a bend means local energy absorption, meaning that the entire member has only small energy absorbency. If a structural member absorbs impact energy more efficiently, the impact energy applied to the passenger in the vehicle will be reduced.

In view of this, the present application discloses a structural member that is capable of efficiently absorbing impact energy and a vehicle using the same.

Means for Solving the Problem

A structural member according to an embodiment of the present invention includes: a top-surface portion; a hat member; and a closing plate. The hat member includes: a pair of side walls extending from both edges of the top-surface portion and facing each other; and a pair of flanges provided on the respective side walls, each flange extending outward as determined along the direction in which the side walls are arranged from a second edge of the associated side wall opposite to a first edge thereof adjacent to the top-surface portion. The closing plate is in contact with the pair of flanges of the hat member. Each of the side walls includes a low-strength portion extending from the first edge of the side wall to a position at a predetermined distance. The predetermined distance is 20 to 40% of the height of the side wall. The yield strength of the low-strength portion is 60 to 85% of the yield strength of the side wall as measured at a position of one-half of the height thereof.

Effect of the Invention

The disclosure of the present application provides a structural member that, when receiving an impact, is capable of efficiently absorbing impact energy.

EMBODIMENTS FOR CARRYING OUT THE INVENTION

Figure 1A:
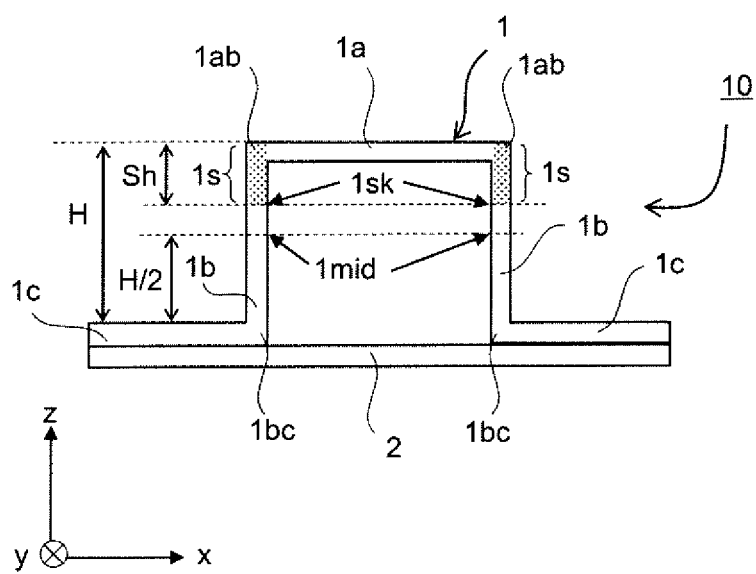
FIG. 1A is a cross-sectional view of a structural member according to an embodiment of the present invention.

A structural member of a first arrangement according to an embodiment of the present invention includes: a closing plate; and a hat member. The hat member includes: a top-surface portion; a pair of flanges provided in contact with the closing plate; and a pair of side walls extending from both edges of the top-surface portion and facing each other. Each of the side walls includes a first edge adjacent to the top-surface portion and a second edge opposite to the first edge, an associated one of the flanges extending from the second edge outward as determined along a direction in which the side walls are arranged. That is, each of the flanges extends from the second edge of the associated one of side walls. The pair of flanges are joined to the closing plate.

Each of the pair of side walls includes a high-strength portion including a middle of the side wall as determined along a direction perpendicular to the top-surface portion and a low-strength portion with a yield strength of 60 to 85% of a yield strength of the side wall as measured at a middle of the side wall. As determined along the direction perpendicular to the top-surface portion, the low-strength portion extends from the first edge of the side wall toward the second edge to a position at a distance of 20 to 40% of a height of the side wall. As determined along a longitudinal direction of the side wall, the low-strength portion extends a distance equal to or larger than the height of the side wall.

In other words, the low-strength portion of each of the pair of a side walls extends from the first edge of the side wall to a position at a predetermined distance (i.e. distance of 20 to 40% of the height of the side wall). That is, the low-strength portion extends from the first edge of the side wall to the border between the high-strength portion and low-strength portion. The distance between the first edge of the side wall and a portion of the border that divides in the height direction of the side wall is 20 to 40% of the height of the side wall.

Further, the dimension of the low-strength portion of each of the side walls as measured in the longitudinal direction of the side wall is equal to or larger than the dimension of the side wall as measured in the height direction (i.e. height of the side wall).

In the first arrangement, the height direction of each of the side walls is the direction perpendicular to the top-surface portion. The height of the side wall is the distance between the first edge of the side wall and the second edge thereof as measured in the direction perpendicular to the top-surface portion. In the second and fourth arrangements, discussed further below, too, the height direction of the side wall is the direction perpendicular to the top-surface portion.

The longitudinal direction of each of the side walls is the longitudinal direction of the structural member and also the longitudinal direction of the top-surface portion. The structural member is an elongated member having a longitudinal direction (longitudinal axis). The longitudinal direction of the side wall is the same as the direction in which a ridge between the side wall and top-surface portion (first ridge) extends. The longitudinal direction of the side wall is substantially perpendicular to the height direction of the side wall.

The yield strength of the low-strength portion of each of the pair of the side walls is 60 to 85% of the yield strength of the side wall as measured at its middle as determined along the direction perpendicular to the top-surface portion. The middle of the side wall as determined along the direction perpendicular to the top-surface portion is a position of a one-half of the height of the side wall.

As determined along the height direction of the side wall, the high-strength portion extends from the border between the low-strength portion and the high-strength portion to the second edge of the side wall (i.e. edge adjacent to the closing plate).

The first arrangement discussed above may be expressed as a second arrangement discussed below. A structural member in the second arrangement includes: at least one closing plate; and a hat member. The hat member includes: a top-surface portion; two first ridges on both edges of the top-surface portion; two flanges joined to the closing plate; two second ridges on edges of the two flanges; and two side walls each located between an associated one of the two first ridges and an associated one of the two second ridges. Each of the two side walls includes a low-strength portion. The low-strength portion of each of the two side walls of the second arrangement extends from the first ridge toward the second ridge to a position at 20 to 40% of a distance between the first ridge and the second ridge as measured in a direction perpendicular to the top-surface portion. As determined along a direction in which the first ridge extends, the low-strength portion extends a length equal to or larger than the distance between the first ridge and the second ridge as measured in the direction perpendicular to the top-surface portion. The low-strength portion has a yield strength of 60 to 85% of a yield strength of the side wall as measured at a middle of the side wall between the first ridge and the second ridge. The middle between the first and second ridges is the same as the middle of the side wall as determined along the direction perpendicular to the top-surface portion.

Each of the two side walls includes the low-strength portion and the high-strength portion having a higher yield strength than the low-strength portion. As determined along the direction perpendicular to the top-surface portion of the side wall, the high-strength portion extends from the second ridge to the border between the low-strength portion and the high-strength portion. The middle portion of the side wall as determined along the direction perpendicular to the top-surface portion is included in the high-strength portion.

A structural member in a third arrangement according to an embodiment of the present invention includes: at least one closing plate; and a hat member. The hat member includes: a top-surface portion; two first ridges on both edges of the top-surface portion; two flanges joined to the closing plate; two second ridges on edges of the two flanges; and two side walls each located between an associated one of the two first ridges and an associated one of the two second ridges. Each of the two side walls includes a low-strength portion. The low-strength portion of each of the two side walls of the third arrangement extends from the second ridge toward the first ridge to a position at 20 to 40% of a distance between the second ridge and the first ridge as measured in a direction perpendicular to the closing plate. As determined along a direction in which the second ridge extends, the low-strength portion extends a length equal to or larger than the distance between the second ridge and the first ridge as measured in the direction perpendicular to the closing plate. The low-strength portion has a yield strength of 60 to 85% of a yield strength of the side wall as measured at a middle of the side wall as determined along the direction perpendicular to the closing plate.

Each of the pair of side walls of the third arrangement includes: a high-strength portion including a middle of the side wall as determined along the direction perpendicular to the closing plate; and a low-strength portion having a yield strength of 60 to 85% of the yield strength of the side wall as measured at its middle. As determined along the direction perpendicular to the closing plate, the low-strength portion extends from the second edge of the side wall toward the first edge to a position at a distance of 20 to 40% of a height of the side wall. The second edge is the one of the two edges as determined along a height direction of the side wall which is adjacent to the closing plate. The first edge is the one of the two edges as determined along the height direction of the side wall which is adjacent to the top-surface portion. As determined along a longitudinal direction of the side wall, the low-strength portion extends a distance equal to or larger than the height of the side wall.

In the third arrangement, the height direction of each of the side walls is the direction perpendicular to the closing plate. The height of the side wall is the distance between the first edge of the side wall and the second edge thereof as measured in the direction perpendicular to the closing plate.

In the third arrangement, each of the two side walls includes the low-strength portion and the high-strength portion having a higher yield strength than the low-strength portion. As determined along the direction perpendicular to the closing plate of each of the side walls, the high-strength portion extends from the first ridge to the border between the low-strength portion and the high-strength portion. The portion of the side wall that is at the middle of the side wall as determined along the direction perpendicular to the closing plate is included in the high-strength portion.

A structural member in a fourth arrangement according to an embodiment of the present invention includes: at least one closing plate; and a grooved member. The grooved member includes: a top-surface portion; two first ridges on both edges of the top-surface portion; two joints joined to the closing plate; and two side walls each located between an associated one of the two first ridges and an associated one of the two joints. Each of the two side walls includes a low-strength portion. The low-strength portion of each of the two side walls of the fourth arrangement extends from the first ridge toward the joint to a position at 20 to 40% of a distance between the first ridge and the joint as measured in a direction perpendicular to the top-surface portion. As determined along a direction in which the first ridge extends, the low-strength portion extends a length equal to or larger than the distance between the first ridge and the joint as measured in the direction perpendicular to the top-surface portion. The low-strength portion has a yield strength of 60 to 85% of a yield strength of the side wall as measured at a middle of the side wall as determined along the direction perpendicular to the top-surface portion.

Each of the two side walls includes the low-strength portion and the high-strength portion having a higher yield strength than the low-strength portion. As determined along the direction perpendicular to the top-surface portion, the high-strength portion is provided on the side wall and extends from the joint to a border between the low-strength portion and the high-strength portion. The portion of the side wall located in the middle between the first ridge and the joint as determined along the direction perpendicular to the top surface is included in the high-strength portion.

In the fourth arrangement, the grooved member has no ridge in contact with the closing plate. Each of the two side walls includes a joint, instead of a second ridge, at the edge opposite to the first ridge. A portion of the side wall adjacent to the joint overlaps the closing plate. The portion of the side wall overlapping the closing plate includes a contact surface in contact with the closing plate. This contact surface extends in the same direction as the side wall.

The height direction of the side wall is the direction perpendicular to the top-surface portion. The height of the side wall is the distance between the first ridge and the joint as determined along the direction perpendicular to the top-surface portion.

A structural member in a fifth arrangement according to an embodiment of the present invention includes: at least one closing plate; and a grooved member. The grooved member includes: a top-surface portion; two first ridges on both edges of the top-surface portion; a flange joined to the closing plate; a second ridge on an edge of the flange; a joint for joining a portion of the grooved member other than the flange, and the closing plate; a first side wall located between one of the two first ridges and the second ridge; and a second side wall located between another one of the two first ridges and the joint.

The first side wall includes a first low-strength portion. The first low-strength portion extends from the first ridge toward the second ridge to a position at 20 to 40% of a distance between the first ridge and the second ridge as measured in a direction perpendicular to the top-surface portion and, as determined along a direction in which the first ridge extends, extends a length equal to or larger than the distance between the first ridge and the second ridge as measured in the direction perpendicular to the top-surface portion, and has a yield strength of 60 to 85% of a yield strength of the side wall as measured at a middle of the side wall as determined along the direction perpendicular to the top-surface portion.

The second side wall includes a second low-strength portion. The second low-strength portion extends from the first ridge toward the joint to a position at 20 to 40% of a distance between the first ridge and the joint as measured in the direction perpendicular to the top-surface portion, and, as determined along a direction in which the first ridge extends, extends a length equal to and larger than the distance between the first ridge and the joint as measured in the direction perpendicular to the top-surface portion, and has a yield strength of 60 to 85% of a yield strength of the side wall as measured at a middle of the side wall as determined along the direction perpendicular to the top-surface portion.

In the fifth arrangement, the first side wall includes the second ridge on the edge opposite to the first ridge. On the other hand, the second side wall includes a joint, instead of a second ridge, on the edge opposite to the first ridge. A portion of the second side wall adjacent to the joint overlaps the closing plate. The portion of the second side wall overlapping the closing plate includes a contact surface in contact with the closing plate. This contact surface extends in the same direction as the second side wall.

The height direction of the second side wall is the direction perpendicular to the top-surface portion. The height of the second side wall is the distance between the first ridge and the joint as measured in the direction perpendicular to the top-surface portion.

A load applied to the top-surface portion compresses the side walls. In other words, each side wall is compressed between the associated first ridge and support. If a member includes a second ridge, the second ridge, in contact with the closing plate, forms the support. In this case, the side wall is the region between the first ridge and second ridge. If a member includes no second ridge, the portion that joins it to the closing plate forms the support. In this case, the side wall is the region between the first ridge and joint. In each of the first, second, fourth and fifth arrangements, the two side walls of the hat member or grooved member each include a high-strength portion including the middle of the side wall as determined along the height direction and a low-strength portion having a lower yield strength than the high-strength portion. The low-strength portion extends from first edge of the side wall adjacent to the top-surface portion to a position at a distance of 20 to 40% of the height of the side wall, and, as determined along the longitudinal direction of the side wall with the low-strength portion (i.e. direction in which the first ridge extends), extends a distance equal to or larger than the height of the side wall (i.e. distance between the first ridge and second ridge or joint as measured in the direction perpendicular to the top-surface portion). The inventors found that such a low-strength portion increases the absorption efficiency of the structural member for impact energy from an impact applied to the top-surface portion. More specifically, they found that, when an impact is applied in a direction perpendicular to the top-surface portion, the low-strength portion, extending from the top-surface portion to a position on the side wall 20 to 40% away from it, disperses the stress from the impact in a direction perpendicular to the direction of the impact (i.e. longitudinal direction of the side wall), and the stiffness of the high-strength portion including the middle of the side wall as determined along the height direction helps reduce deformation of the structural member. Further, they found that, if the yield strength of the low-strength portion of each side wall is 60 to 80% of the yield strength of the side wall as measured at the middle position as determined along the height direction, the absorption efficiency of the structural member for impact energy increases to the required level. That is, when receiving an impact, the structural member of each of the first, second and fourth arrangements efficiently absorbs impact energy.

In the third arrangement, each of the two side walls of the hat member includes a high-strength portion including the middle of the side wall as determined along the height direction and a low-strength portion having a lower yield strength than the high-strength portion. The low-strength portion extends from the second ridge of the side wall (i.e. edge adjacent to the closing plate) to a position at a distance of 20 to 40% of the height of the side wall as measured in the direction perpendicular to the closing plate (i.e. distance between the first and second ridges) and, as determined along the longitudinal direction of the side wall (i.e. direction in which the second ridge extends) extends a length equal to or larger than the distance between the second and first ridges as measured in the direction perpendicular to the closing plate. The inventors found that providing such a low-strength portion in each of the two side walls of the hat member increases the absorption efficiency of the structural member for impact energy from an impact applied to the closing plate. More specifically, they found that, when an impact is applied in a direction perpendicular to the closing plate, the low-strength portion, extending from the closing plate to a position on the side wall 20 to 40% away from it, disperses the stress from the impact in a longitudinal direction and the stiffness of the high-strength portion including the middle of the side wall as determined along the height direction helps reduce deformation of the structural member. Further, the inventors found that, if the yield strength of the low-strength portion of each side wall is 60 to 80% of the yield strength of the side wall as measured at the middle position as determined along the height direction, the absorption efficiency of the structural member for impact energy increases to the required level. That is, when receiving an impact, the structural member of the third arrangement efficiently absorbs impact energy.

Starting from one of the first to fifth arrangements, it is desirable that the low-strength portion be located at a middle of the side wall as determined along the longitudinal direction. The reasons are as follows: The middle of the side wall as determined along the longitudinal direction is distant from the ends thereof as determined along the longitudinal direction. Portions near these ends are usually connected to and supported by other members. When a load acts on the middle of a member supported on the ends, bending moment increases. As the low-strength portion is located at the middle of the side wall as determined along the longitudinal direction, the low-strength portion is located at a position where the deformation from an impact tends to be large. This will increase the absorption efficiency for impact energy. In the first, second, fourth and fifth arrangements, the longitudinal direction of the side wall is the direction in which the first ridge between the side wall and top-surface portion extends; in the third arrangement, it is the direction in which the second ridge between the side wall and closing plate extends.

Starting from one of the first to sixth arrangements, the top-surface portion or the closing plate may include at least two connections spaced apart from each other as determined along the longitudinal direction of the side walls and connected to another member. In this case, it is desirable that the low-strength portion be located at a middle between the at least two connections as determined along the longitudinal direction of the side walls. The reasons are as follows: The middle between the two connections is distant from the positions at which the member is supported by the other member. When a load acts on the middle between the two connections, bending moment increases. Thus, as the low-strength portion in a structural member supported at least two connections is provided at the middle between the two connections, the low-strength portion is located at the middle at which the deformation from an impact tends to be large. This will increase the absorption efficiency for impact energy.

Starting from one of the first, second, fourth and fifth arrangements, it is desirable that, for each of the two side walls, a tensile strength of the side wall as measured at a middle as determined along the direction perpendicular to the top-surface portion be 980 MPa or higher. This is because an improvement in absorption efficiency for impact energy can be effectively achieved in a structural member with such a high strength. The height direction of the side wall is the direction perpendicular to the top-surface portion.

Starting from the third arrangement, it is desirable that, for each of the two side walls, a tensile strength of the side wall as measured at a middle of the side wall as determined along the direction perpendicular to the closing plate be 980 MPa or higher. This is because an improvement in absorption efficiency for impact energy can be effectively achieved in a structural member with such a high strength.

A vehicle including the structural member of one of the first, second, fourth and fifth is also included in embodiments of the present invention. In such a vehicle, it is preferable that the structural member is positioned such that the top-surface portion is located outward with respect to the vehicle and the closing plate is located inward with respect to the vehicle. Thus, when an impact is applied to the top-surface portion of the structural member from outside the vehicle, the structural member will efficiently absorb the impact.

A vehicle including the structural member of the third arrangement is also included in embodiments of the present invention. In such a vehicle, it is preferable that the structural member is positioned such that the closing plate is located outward with respect to the vehicle and the top-surface portion is located inward with respect to the vehicle. Thus, when an impact is applied to the closing plate of the structural member from outside the vehicle, the structural member will efficiently absorb the impact.

In the structural member of the first to fourth arrangements, the two edges of the top-surface portion are the two ends thereof as determined along a direction perpendicular to the longitudinal direction of the top-surface portion. The longitudinal direction of the top-surface portion is the longitudinal direction of the structural member and also the longitudinal direction of the side wall. The longitudinal direction of the structural member is the direction in which the space enclosed by the hat member (or grooved member) and the closing plate extends. That is, the axial direction of the tubular portion formed by the hat member (or grooved member) and the closing plate is the longitudinal direction of the structural member.

The two side walls extending from the edges of the top-surface portion extend in the same direction relative to the top-surface portion. That is, the two side walls face each other and extend from the two edges of the top-surface portion. The two side walls are constructed to support the top-surface portion from inside the top-surface portion. The two side walls facing each other is not limited to the two side walls having parallel inner surfaces.

[Embodiment 1]

Figure 1B:
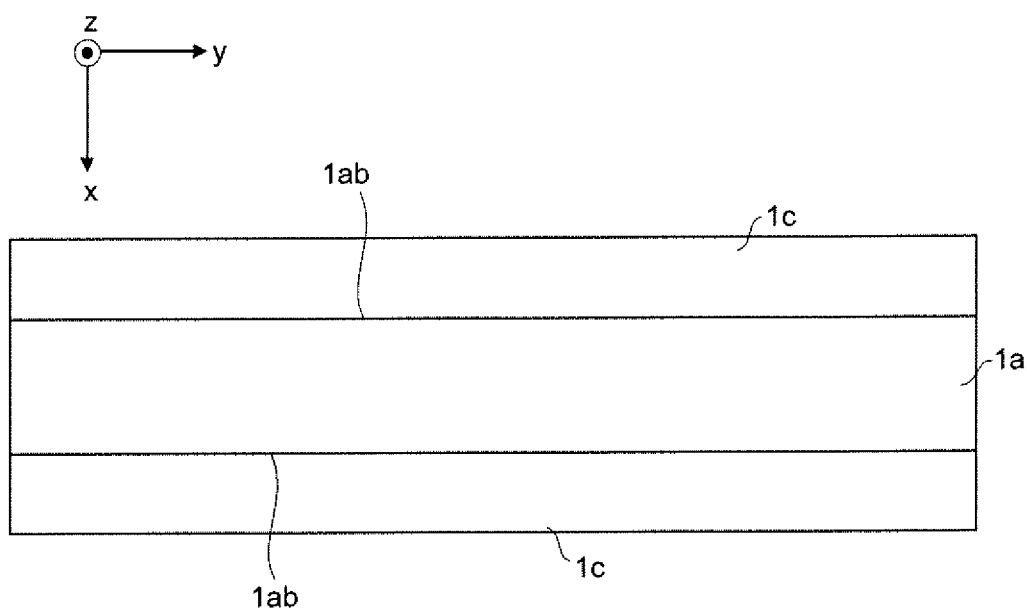
FIG. 1B is a plan view of the structural member shown in FIG. 1A.
Figure 1C:
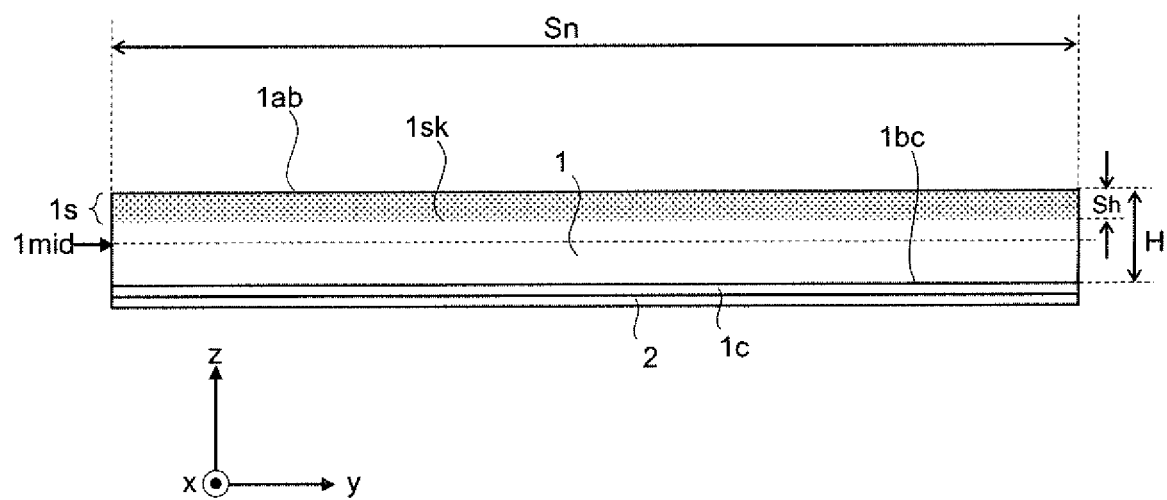
FIG. 1C is a side view of the structural member shown in FIG. 1A.

Embodiment 1 relates to the first, second, fourth and fifth arrangements described above. FIG. 1A is a cross-sectional view of a structural member of an embodiment of the present invention; FIG. 1B is a side view of the structural member shown in FIG. 1A; and FIG. 1C is a side view of the structural member shown in FIG. 1A. The structure shown in FIGS. 1A to 1C relates to the first and second arrangements.

The structural member 10 shown in FIGS. 1A to 1C includes a hat member 1 having a hat-shaped cross section and a closing plate 2 joined to the hat member 1. The structural member 10 has a closed cross section defined by the hat member 1 and closing plate 2.

As shown in FIG. 1A, the hat member 1 includes a top-surface portion 1a, a pair of side walls 1b, and a pair of flanges 1c. The side walls 1b extend from both edges of the top-surface portion 1a and face each other. For each of the side walls 1b having a first edge adjacent to the top-surface portion 1a and a second edge opposite thereto, the associated one of the flanges 1c extends from the second edge of the side wall 1b outwardly as determined along the direction in which the side walls 1b are arranged. The closing plate 2 is in contact with the flanges 1c.

As shown in FIG. 1B, the border between the top-surface portion 1a and each of the side walls 1b (or shoulder), 1ab, forms a ridge extending in the longitudinal direction (hereinafter referred to as first ridge 1ab). The first ridge 1ab is a bend in the hat member 1 (or simply bend). The two edges of the top-surface portion 1a as determined along a direction (or x-direction) perpendicular to the longitudinal direction form a pair of first ridges 1ab. The side walls 1b extend from the first ridges 1ab. The side walls 1b extend in the same direction (or z-direction). The dimension of the structural member 10 as measured in the direction in which the ridges (first ridges 1ab) formed by the borders between the top-surface portion 1a and the side walls 1b extend (or y-direction) is larger than the dimension thereof as measured in the direction in which the side walls 1b are arranged (i.e. x-direction). The longitudinal direction of the structural member 10 is the same as the direction in which the first ridges 1ab formed between the top-surface portion 1a and side walls 1b extend.

As shown in FIGS. 1A and 1C, the border 1bc between a flange 1c and the associated one of the side walls 1b forms a ridge extending in the longitudinal direction (hereinafter referred to as second ridge 1bc). The second ridge 1bc is a bend in the hat member 1 (or simply bend). Each side wall 1b has the first edge adjacent to the top-surface portion 1a and the second edge opposite thereto, and has a second ridge 1bc on the second edge. That is, a pair of flanges 1b extend away from each other, starting at the pair of second ridges 1bc on the second edges of the pair of side walls 1b.

As shown in FIGS. 1A and 1C, each of the side walls 1b has a low-strength portion 1s starting at the first edge of the side wall 1b and ending at the position at a distance Sh. The low-strength portion 1s has a lower strength than the other portions. The portions of each of the side walls 1b other than the low-strength portion 1s constitute a high-strength portion with a higher strength than the low-strength portion 1s. As determined along the height direction of each side wall 1b (i.e. direction perpendicular to the top-surface portion 1a), the low-strength portion 1s extends from the first edge adjacent to the top-surface portion 1a (i.e. first ridge (ab) to the position at the distance Sh away from the first ridge 1ab. That is, the border 1sk between the low-strength portion 1s and high-strength portion is located at the distance Sh away from the first ridge 1ab. The distance between the border 1sk and the first ridge 1ab as measured in the height direction of the side wall 1b is the distance Sh. The portions of the wall beginning at the border 1sk between the low-strength portion 1s and high-strength portion and ending at the second ridge 1bc (or flange 1c) constitute the high-strength portion.

Further, as shown in FIG. 1C, the low-strength portion 1s extends a distance equal to or larger than the height H of the side wall 1b as measured in the longitudinal direction of the side wall 1b (or direction in which the first ridge 1ab extends (i.e. y-direction)). That is, the dimension Sn of the low-strength portion 1s as measured in the longitudinal direction of the side wall 1b is equal to or larger than the height H of the side wall 1b. The height of the side wall 1b is the distance between the first ridge 1ab (i.e. first edge of the side wall 1b) and second ridge 1bc (i.e. second edge of the side wall 1b) as measured in the direction perpendicular to the top-surface portion 1a (or z-direction). Thus, the low-strength portion 1s extends from the first ridge 1*ab* to the position at the distance Sh as measured in the height direction of the side wall 1*b* and extends a distance equal to or larger than the height H of the side wall 1*b* as measured in the longitudinal direction of the side wall 1*b*.

Figure 2:
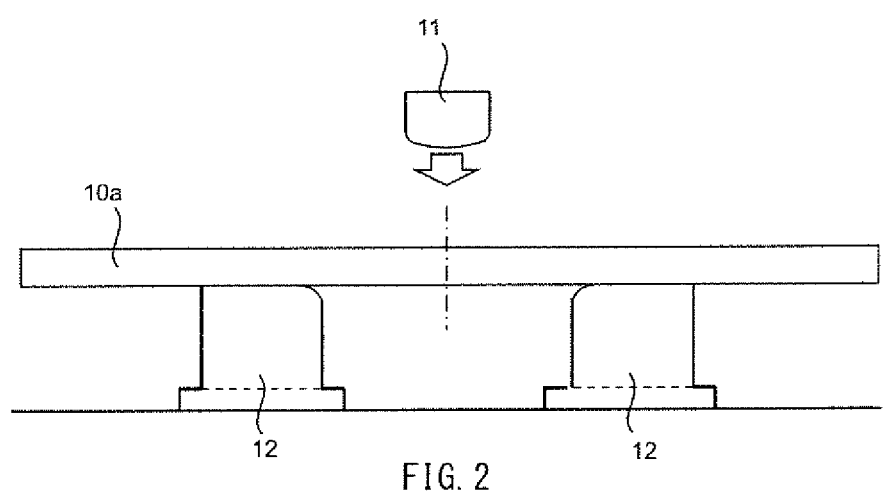
FIG. 2 schematically illustrates how an impact test may be conducted.

Thus, in the structural member 10, each side wall 1*b* may include a low-strength portion 1*s* adjacent to the top-surface portion 1*a* to reduce the extent of deformation as measured in the bend direction from an impact applied to the structural member 10. This is based on the finding discussed below, obtained by the inventors by carefully observing how the structural member is deformed by an impact. The inventors conducted impact tests (or simulations) in which an indenter was caused to hit a structural member, composed of a hat member and closing plate, and observed the deformation behavior of the structural member. FIG. 2 schematically illustrates how an impact test may be conducted. For the impact test, the structural member 10*a* is placed on two stands 12 so as to stretch over and between them. The indenter 11 was caused to hit the portion of the structural member 10*a* located at the middle between the two stands 12.

Figure 3:
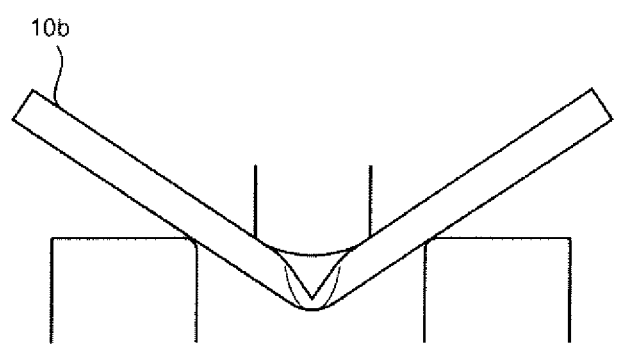
FIG. 3 shows how a structural member having a uniform strength distribution may deform under an impact.
Figure 4:
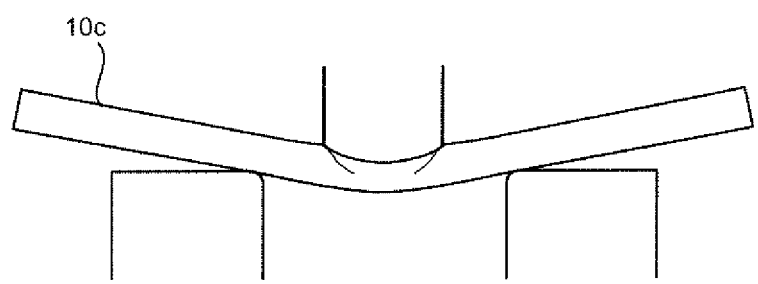
FIG. 4 shows how a structural member having a low-strength portion may deform under an impact.

FIG. 3 illustrates how a structural member 10*b* having a uniform strength distribution may deform when an impact is applied thereto. FIG. 4 illustrates how a structural member 10*c* having a low-strength portion similar to that of FIGS. 1A to 1C may deform when an impact similar to that of FIG. 3 is applied thereto. As shown in FIG. 3, in the case of the structural member 10*b* with a uniform strength distribution, the bend sharply protrudes. This manner of deformation will be referred to as sharp bend. On the other hand, in the case of the structural member 10*c* with side walls including low-strength portions, the top-surface portion that has received an impact and portions of the side walls extending from the two edges of the top-surface portion are crushed by the impact, as shown in FIG. 4. This manner of deformation will be referred to as cross-section crush. In the case of FIG. 4, larger portions are deformed when receiving a given impact load and contribute to impact absorption than in the case of FIG. 3, resulting in a smaller extension of protrusion in the bend direction of the structural member.

Figure 5:
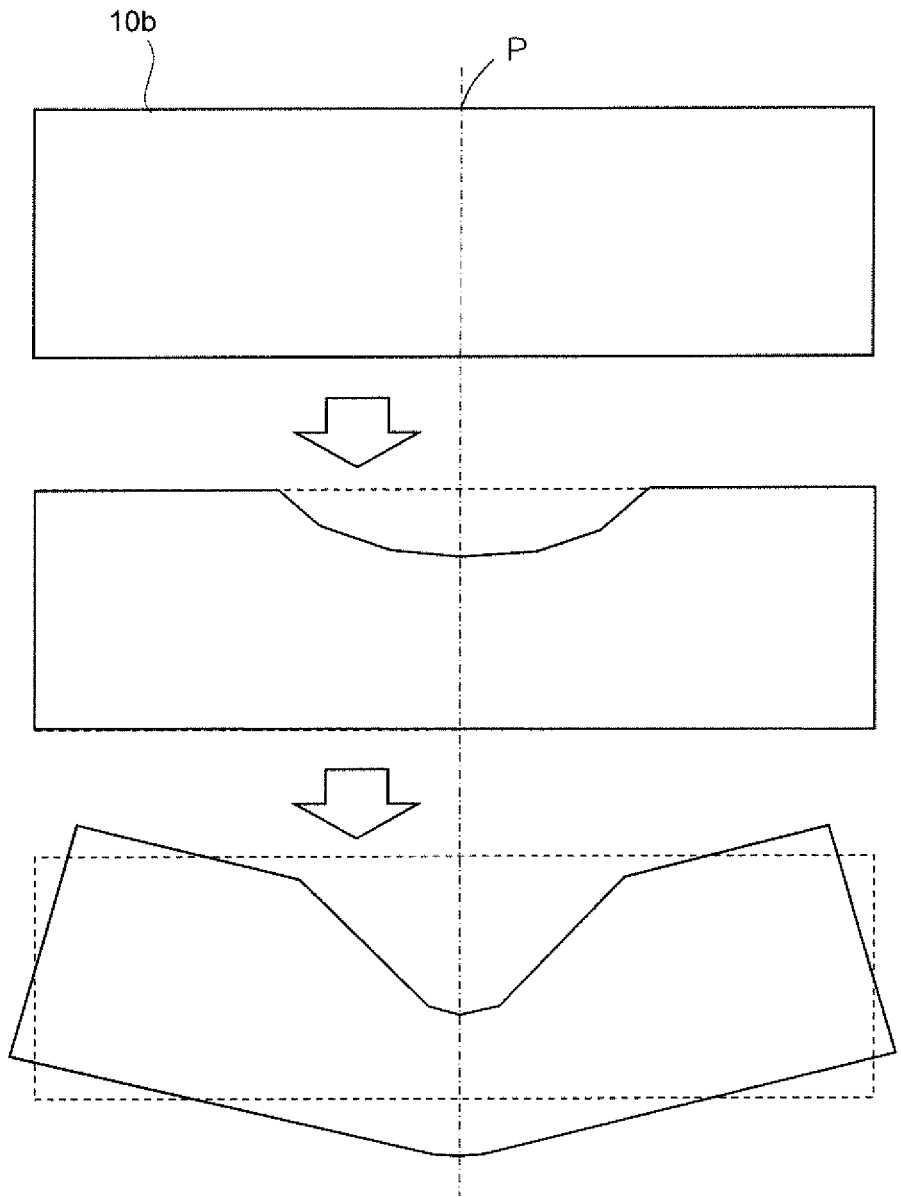
FIG. 5 illustrates the deformation behavior of a structural member having a uniform strength distribution.
Figure 6:
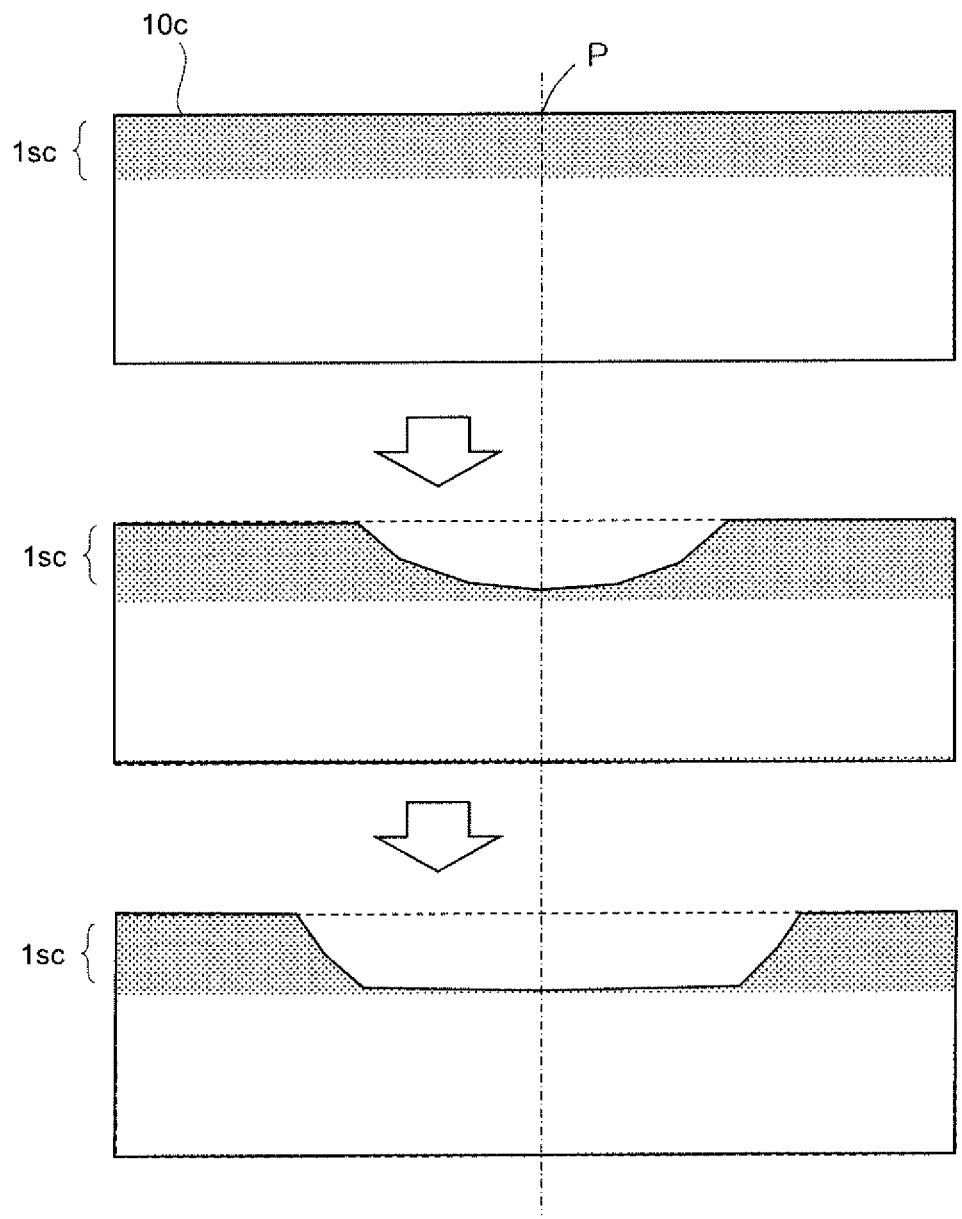
FIG. 6 illustrates the deformation behavior of a structural member having a low-strength portion.

FIG. 5 illustrates the deformation behavior of the structural member 10*b* with a uniform strength distribution. FIG. 6 illustrates the deformation behavior of the structural member 10*c* having a low-strength portion as shown in FIGS. 1A to 1C. FIGS. 5 and 6 each show a construction as viewed from a side of the structural member, i.e. from a side wall.

As shown in FIG. 5, in the structural member 10*b* having a uniform strength distribution, the deformation initiated at the bend deformation initiation point P by an impact proceeds in a height direction of the side walls such that the top-surface portion and side walls form a wedge shape as viewed from a side. As a result, the member bends so as to sharply protrude in the bend direction (i.e. height direction of the side wall). In some cases, the side walls may develop a crack.

As shown in FIG. 6, in the structural member 10*c* having side walls each including a low-strength portion 1*sc* (dotted in FIG. 6) adjacent to the top-surface portion, the deformation proceeding inward from the bend deformation initiation point P, when arriving at the border of the low-strength portion 1*sc*, does not advance toward portions with larger strengths than the low-strength portion 1*sc*, but tends to proceed in horizontal directions (i.e. in the longitudinal direction of the structural member 10*c*), where the strength is relatively small. Thus, the deformation expands in the longitudinal direction, and the extent of deformation as measured in the bend direction (i.e. height direction of the side walls) is small.

Figure 7A:
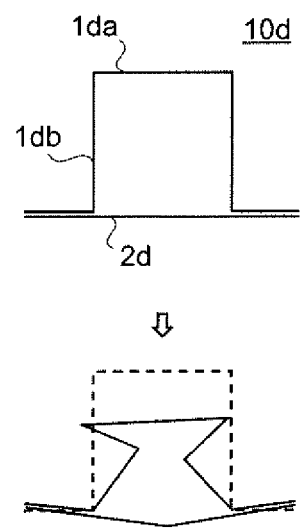
FIG. 7A shows how a structural member may deform under an impact load.
Figure 7B:
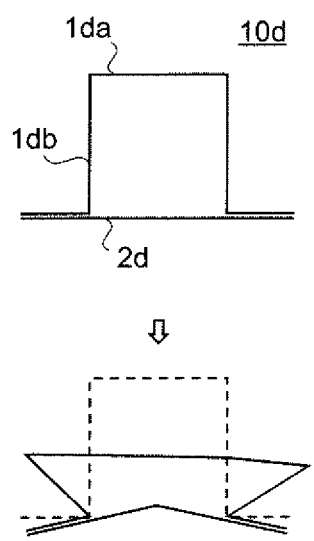
FIG. 7B shows how a structural member may deform under an impact load.

Further, when a structural member composed of a hat member and a closing plate is bent in a direction perpendicular to the top-surface portion, portions of each side wall at and near the middle as determined along the height direction tend to be bent. That is, portions of each side wall at and near the position of one-half of its height tend to constitute an initiation point of a sharp bend. FIGS. 7A and 7B show how a structural member 10*d* composed of a hat member having a top-surface portion 1*da* and side walls 1*db* extending from the two edges of the top-surface portion and a closing plate 2*d* deforms under an impact load. When an impact load is applied to the top-surface portion 1*da*, the shoulders of the hat member (i.e. bends at the borders between the top-surface portion 1*da* and side walls 1*db*) deform such that their angles change, and portions of the side walls 1*db* located at the middle as determined along the height direction are sharply bent; as a result, the structural member 10*d* crushes. To prevent such sharp bending of the side walls 1*db* from occurring easily, in the structural member 10 shown in FIGS. 1A to 1C, portions of the side walls 1*b* located at the middle as determined along the height direction have large strengths.

That is, in the structural member 10, portions of each side wall 1*b* located at the position 1mid of the middle as determined along the height direction (i.e. one-half) have relatively large strengths, and portions of the side wall 1*b* located closer to the top-surface portion 1*a* than the position 1mid of the middle as determined along the height direction of the side wall constitute a low-strength portion 1*s* having a smaller strength than the portions at the middle position 1mid. Appropriately adjusting the range of the low-strength portion 1*s* and the strength ratio of the low-strength portion Is relative to the portion at the middle position 1mid as determined along the height direction will prevent bending of the side wall 1*b* at the middle position 1mid from occurring easily and, in addition, increase the extent of crushing of portions of the side wall 1*b* in the longitudinal direction located closer to the top-surface portion 1*a* than the middle position 1mid. As a result, as shown in FIG. 6, the deformation behavior is such that the extent of deformation in the bend direction is small.

The deformation behaviors shown in FIGS. 7A and 7B can be found not only when the indenter is caused to hit the top-surface portion of the structural member. Similar deformation behaviors can also be found, for example, when the structural member is bent by an axial force that compresses the member in the longitudinal direction or when the indenter is pressed against the top-surface portion and a force in a direction perpendicular to the longitudinal direction is statically applied to bend the member, as in a three-point bending test.

Figure 8:
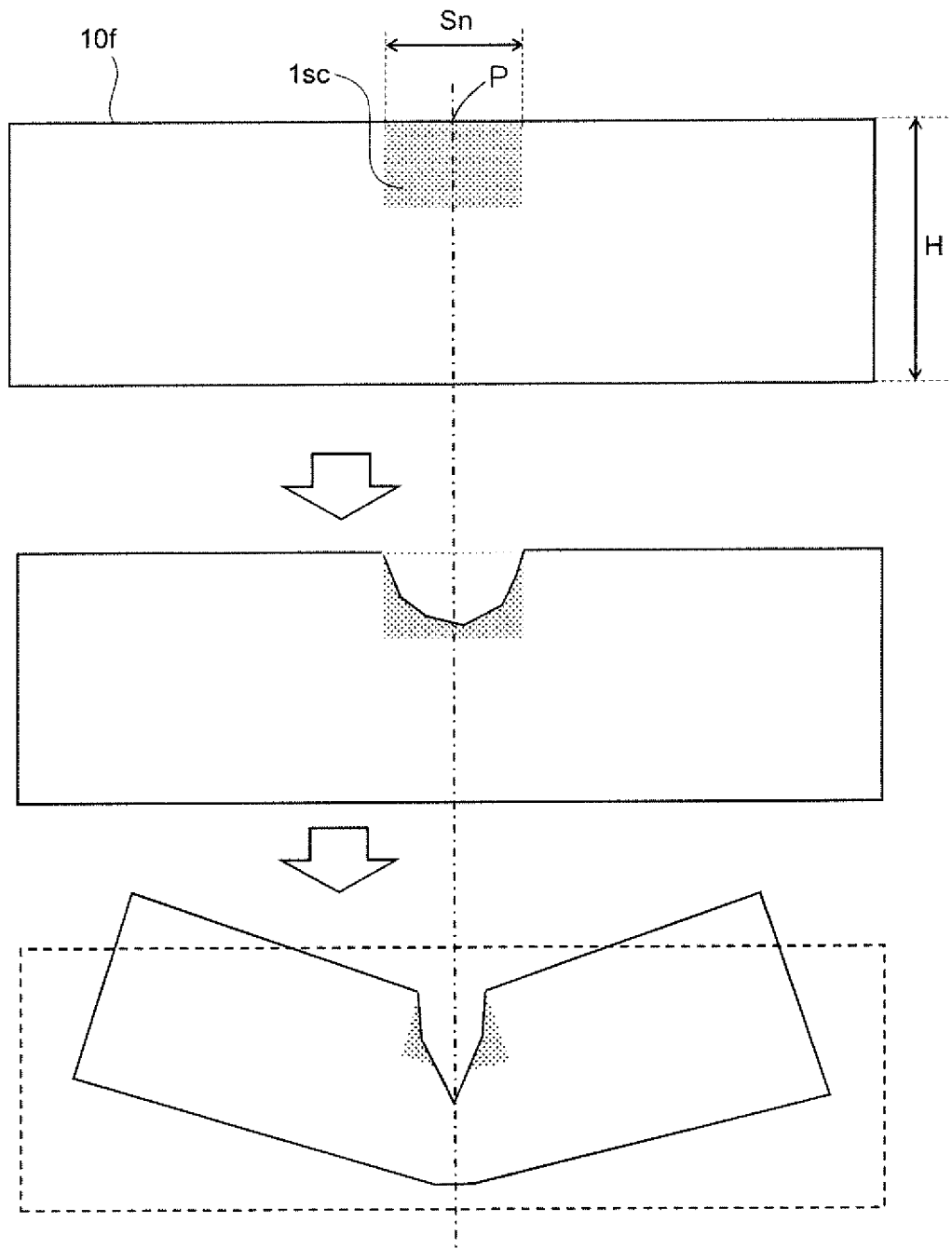
FIG. 8 illustrates the deformation behavior of a structural member with a low-strength portion with a smaller range than that of FIG. 6.

Further, the inventors have also found that the dimension of the low-strength portion 1*s* as measured in the longitudinal direction (i.e. direction in which the first ridge 2 extends) is an important factor in reducing the extent of deformation in the bend direction as shown in FIG. 6. FIG. 8 illustrates the deformation behavior found when the length Sn of the low-strength portion 1*sc* as measured in the longitudinal direction is smaller than one-half of the height H of the side wall 1*b* (H/2). As shown in FIG. 8, if the dimension of the low-strength portion as measured in the longitudinal direction is small, the deformation proceeding inward from the bend deformation initiation point P reaches early the border between the low-strength portion 1*sc* and high-strength portion as determined along the longitudinal direction. As a result, crushing in the longitudinal direction is restricted, and the deformation in the height direction can easily proceed.

The inventors conducted bending tests on and an analysis of structural members under various conditions, and found that, when a structural member bends, the range of deformation in the longitudinal direction is substantially equal to the height of the side walls. Also, the inventors found that, when the dimension of the low-strength portion $1sc$ as measured in the longitudinal direction is equal to or larger than the height of the side walls, the deformation due to an impact can be dispersed in the longitudinal direction, thereby reducing the extent of deformation in the bend direction.

Based on the above-discussed findings, the inventors arrived at the following construction of the structural member 10: Each of a pair of side walls $1b$ shown in FIGS. 1A and 1C has a low-strength portion $1s$ extending from the first edge of the side wall $1b$ to the position at the distance Sh. The distance Sh for the low-strength portion $1s$ of the side wall $1b$ may be 20 to 40% of the height H of the side wall $1b$. The yield strength of the low-strength portion $1s$ may be 60 to 85% of the yield strength of portions of the side wall $1b$ as measured at a position 1mid at one-half of the height H of the side wall $1b$ (that is, middle position 1mid as determined along the height direction).

That is, in a cross section of the hat member, for each side wall $1b$, a low-strength portion $1s$ with a yield strength of 60 to 85% of that of portions of the wall as located at a position of 50% of the height H (i.e. middle of the side wall $1b$ as determined along the height direction) extends from the edge of the side wall $1b$ adjacent to the top-surface portion $1a$ to a position of 20 to 40% of the height H of the side wall $1b$. In other words, the low-strength portion $1s$ extends from the first ridge $1ab$ toward the second ridge $1bc$ to a position of 20 to 40% of the distance between the first ridge $1ab$ and second ridge $1bc$ as measured in the direction perpendicular to the top-surface portion $1a$. The yield strength of the low-strength portion $1s$ is 60 to 85% of the yield strength of the side wall $1b$ as measured at the middle between the first and second ridges $1ab$ and $1bc$.

Thus, for example, the deformation behavior found when an impact is applied to the top-surface portion $1a$ tends to be represented by a cross-section crush as shown in FIG. 4. As a result, the extent of the bend in the direction perpendicular to the top-surface portion $1a$ is reduced. Thus, when receiving an impact, the structural member 10 absorbs more impact energy with a smaller deformation. That is, the structural member 10 can efficiently absorb impact energy.

Preferably, the distance Sh for the low-strength portion $1s$ is not larger than 35% of the height H of the side wall $1b$, and more preferably not larger than 30%. Further, preferably, the distance Sh is not smaller than 25% of the height H of the side wall $1b$. Preferably, the ratio of the strength of the low-strength portion $1s$ of each side wall $1b$ relative to the strength of portions at the middle position 1mid as determined along the height direction (strength ratio) is not higher than 80%. Preferably, the strength ratio is not lower than 70%.

The low-strength portion $1s$ preferably extends a distance equal to or larger than the height H of the side wall $1b$ as measured in the longitudinal direction of the side wall $1b$. That is, in the direction in which the first ridge $1ab$ extends, the low-strength portion $1s$ extends a length equal to or larger than the distance between the first and second ridges $1ab$ and $1bc$ as measured in the direction perpendicular to the top-surface portion $1a$. This facilitates proceeding of any deformation in the longitudinal direction, thereby further reducing displacement in the bend direction. The dimension of the low-strength portion $1s$ as measured in the direction in which the first ridge $1ab$ extends is preferably not smaller than 1.5 times the height of the side wall $1b$ (3H/2), and more preferably not smaller than twice the height of the side wall $1b$ (2H).

It is desirable that the tensile strength of the side wall $1b$ as measured at the middle position 1mid as determined along the height direction be not lower than 980 MPa (yield strength not lower than 500 MPa), for example. This provides sufficient strength of the side wall $1b$ as measured at the middle position as determined along the height direction, thereby preventing the side wall $1b$ from breaking at this position 1mid. The portions of the structural member 10 other than the low-strength portion $1s$ may have a similar strength to that for the middle position 1mid as determined along the height direction.

The portions of the side wall between the first and second ridges $1ab$ and $1bc$ that extend from the edge of the low-strength portion $1s$ to the second ridge $1bc$ (flange $1c$) constitute a high-strength portion. The yield strength of the high-strength portion is higher than the yield strength of the low-strength portion $1s$. The strength distribution in the high-strength portion may not be uniform.

At least part of the top-surface portion $1a$ may be a low-strength portion, or a low-strength portion may not be part of the top-surface portion $1a$. The inventors found that the strength of the side walls $1b$ has a dominant influence on the bend deformation of the structural member 10. The strength of the top-surface portion $1a$ has less influence on the bend deformation than the strength of the side walls $1b$.

As shown in FIG. 1A, the hat member 1 includes a pair of flanges $1c$, a pair of side walls $1b$ each represented by a sharp bend of a flange $1c$ to extend vertically, and a top-surface portion $1a$ sandwiched between the side walls $1b$. In the implementation shown in FIG. 1A, the side walls $1b$ are perpendicular to the flanges $1c$. The side walls $1b$ have the same length. The flanges $1c$ and the top-surface portion $1a$ are parallel to each other. The distance Sh for the low-strength portion $1s$ in one of the side walls $1b$ is equal to the distance Sh for the low-strength portion $1s$ in the other, opposite, side wall $1b$. In FIG. 1A, the strength distribution of the structural member 10 is bilaterally symmetrical.

The construction of the structural member 10 is not limited to the implementation shown in FIG. 1A. For example, the angle between a side wall $1b$ and a flange $1c$ may not be 90° (i.e. the right angle). Similarly, the angle between a side wall $1b$ and the top-surface portion $1a$ may not be 90° (i.e. the right angle). For example, a cross section of the structural member 10 perpendicular to the longitudinal direction may be trapezoidal in shape. That is, the shape of a closed cross section defined by the top-surface portion $1a$, side walls $1b$ and closing plate 2 may be trapezoidal. In such implementations, a cross section perpendicular to the first ridge $1ab$ may be bilaterally symmetrical in shape, or may not be bilaterally symmetrical. The side walls $1b$ may have different lengths. As a result, the flanges $1c$ and top-surface portion $1a$ may not be parallel to each other. The heights of the flanges $1c$ (i.e. their positions as determined along the z-direction) may be different.

Further, the shape of a cross section of a corner (or shoulder) that forms the border between a side wall $1b$ and the top-surface portion $1a$ may include a round section (or curved section). Similarly, the shape of a cross section of a corner (or shoulder) that forms the border between a side wall 1b and a flange 1c may include a round section (or curved section). The surface of a side wall 1b and/or the top-surface portion may be curved, instead of being flat. That is, the side walls 1b and/or top-surface portion 1a may be curved. If the radius of curvature of the round section at the corner between a side wall 1b and the top-surface portion 1a is too large, the ability of the side wall 1b to support a load in the height direction decreases. In view of this, the radius of curvature of the inner surface of the round (curved) section at the corner between a side wall 1b and the top-surface portion 1a may be not larger than 15 mm, for example. Alternatively, the radius of curvature of the inner surface of the round (curved) section at the corner between a side wall 1b and the top-surface portion 1a is not larger than one-third of the height H of the side wall 1b (R≤H/3), for example.

At least one of the side walls 1b may include a recess (or groove), a protrusion (or ridge), a step or a hole. The top-surface portion 1a may include a recess (or groove), a protrusion (or ridge), a step or a hole. However, the recess (or groove), protrusion (or ridge), step or hole in the side wall 16 or top-surface portion 1a must be sized so as not to significantly affect the deformation behavior of the structural member 10. For example, the structural member 10 may have a double-hat construction or a triple- or more-hat construction with a protrusion on the top-surface portion 1a.

If the corner forming the border between a side wall 1b and the top-surface portion 1a or the corner forming the border between a side wall 1b and a flange 1c includes a round section (or curved section), in a cross section perpendicular to the longitudinal direction, the height H of the side walls 1b and the distance Sh for the low-strength portion 1s are determined where the edge of a side wall 1b is represented by that termination of the round section (edge of the curved section) which is more distant from the middle position 1mid of the side wall 1b as determined along the height direction.

That is, the height H of the side walls 1b and the distance Sh for the low-strength portion 1s as measured in the height direction are determined where the first edge of a side wall 1b is represented by that edge of the curved section (i.e. termination of the round section) between the side wall 1b and top-surface portion 1a which is adjacent to the top-surface portion. Further, the height H of the side walls 1b and the distance Sh for the low-strength portion 1s as measured in the height direction are determined where the second edge of a side wall 1b is represented by that edge of the curved section (i.e. termination of the round section) between the side wall 1b and flange 1c which is located adjacent to the flange 1c.

Similarly, the height H of a side wall 1b and the distance Sh for the low-strength portion 1s as measured in the height direction are determined based on the first and second ridges 1ab and 1bc. In this case, more specifically, the first ridge 1ab is represented by that edge of the round (i.e. curved) section (i.e. termination of the round section) between a side wall 1b and the top-surface portion 1a which is adjacent to the top-surface portion 1a, that is, that termination of the round (or curved) section (i.e. edge of the curved section) which is more distant from the middle position 1mid of the side wall 1b as determined along the height direction. The second ridge 1bc is represented by that edge of the round (i.e. curved) section (i.e. termination of the round section) between a side wall 1b and a flange 1c which is adjacent to the flange 1c, that is, that termination of the round (i.e. curved) section (i.e. edge of the curved section) which is more distant from the middle position 1mid of the side wall 1b as determined along the height direction.

The height of a side wall 1b is the dimension of the side wall 1b between the first edge and the second edge as measured in the height direction. In other words, the height of the side wall 1b is the dimension of the side wall 1b between the first and second ridges 1ab and 1bc as measured in the direction perpendicular to the top-surface portion 1a. The distance Sh for the low-strength portion 1s is the distance between the first edge of the side wall 1b and the border for the low-strength portion 1s of the side wall 1b as measured in the height direction. That is, the distance Sh for the low-strength portion 1s is the distance between the first ridge 1ab and the border between the low-strength portion 1s and high-strength portion of the side wall 1b as measured in the direction perpendicular to the top-surface portion 1a. The position of one-half of the height of the side wall 1b, 1mid, is the middle position of the side wall 1b as determined along the height direction. That is, the position 1mid of one-half of the height of the side wall 1b is the position on the side wall 1b at the middle between the first and second ridges 1ab and 1bc as determined along the direction perpendicular to the top-surface portion 1a.

The height direction of a side wall 1b is the direction perpendicular to the top-surface portion 1a. More specifically, the direction perpendicular to the top-surface portion 1a is the direction perpendicular to the plane of the surface of the top-surface portion 1a. If, in a cross section perpendicular to the longitudinal direction, the top-surface portion 1a includes a recess, a protrusion, a step or a curved section, then, the direction perpendicular to the top-surface portion is represented by the direction perpendicular to an imaginary plane connecting the two first ridges 1ab.

The closing plate 2 is joined to the flanges 1c on both sides of the hat member 1, and fixed thereto. When an impact load is applied to the top-surface portion 1a of the hat member 1, the closing plate 2 prevents the hat member 1 from being expanded and opening and thus crushing. The closing plate 2 may include a recess, a protrusion, a step or a hole. The method of joining the closing plate 2 to the hat member 1 may be any one for fixing these two parts. For example, these parts may be joined by welding or through fasteners. The closing plate 2 does not have to be a flat plate, and may have a hat-shaped cross section, for example.

In the implementation shown in FIG. 1B, the structural member 10 extends straight in the longitudinal direction. Alternatively, the structural member 10 may extend in the longitudinal direction so as to be curved. For example, as viewed from a side (i.e. in the x-direction), the member may be curved so as to protrude from the top-surface portion 1a (i.e. positive z-direction). Further, the structural member 10 may be curved as viewed from above (i.e. in a z-direction). Further, the width of the top-surface portion 1a (i.e. dimension as measured in the direction (x-direction) perpendicular to the longitudinal direction) may not be constant. The height of the side walls 1b (i.e. length as measured in the z-direction) may not be constant.

Figure 9A:
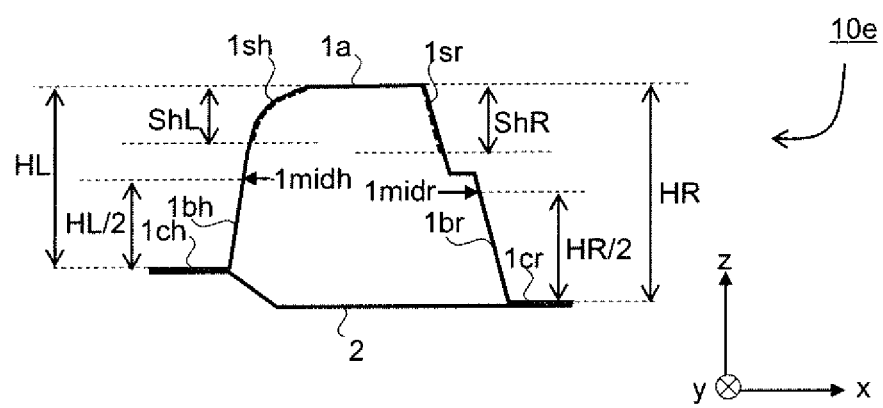
FIG. 9A is a cross-sectional view of a structural member according to a variation of the embodiment.

FIG. 9A is a cross-sectional view of a structural member 10e according to a variation of the present embodiment. The structural member 10e includes a pair of side walls 1br and 1bh with different shapes. The side walls 1br and 1bh have different angles relative to the flanges 1cr and 1ch and different heights HR and HL. As such, the positions of the flanges 1cr and 1ch as determined along the height direction are different. Further, the position 1midr of one-half of the height direction HR of one side wall 1br and the position 1midh of one-half of the height HL of the other side wall 1bh as determined along the height direction are different. The distance ShR for the low-strength portion 1*sr* of the one side wall 1*br* and the distance ShL for the low-strength portion 1*sh* of the other side wall 1*bh* are different. Thus, if a cross section of the structural member 10*e* is not bilaterally symmetrical, then, in the side walls 1*br* and 1*bh*, the respective heights HR and HL, the respective middle positions 1midr and 1midh as measured in the height direction, and the respective low-strength portions 1*sr* and 1*sh* are separately decided.

In the implementation shown in FIG. 9A with a pair of side walls 1*br* and 1*bh*, one side wall 1*br* has a stepped portion. Thus, when the side wall 1*br* has a stepped portion, too, the height HR of the side wall 1*br* is defined as the distance between the first edge and the second edge of the side wall 1*br* as measured in the height direction. That is, the height HR of the side wall 1*br* is defined as the distance between the lowermost point of the side wall 1*br* and the uppermost point thereof as measured in the height direction. The same applies when the side wall 1*br* has a recess, a protrusion, or a hole. A similar definition applies to the distance ShR for the low-strength portion: the distance ShR for the low-strength portion 1*sr* is defined as the distance between the lowermost point of the low-strength portion 1*sr* and the uppermost point thereof as measured in the height direction.

The other side wall 1*bh* of the pair of side walls 1*b* includes a round section (curved section) adjacent to first edge. In this implementation, the height HL of the side wall 1*bh* and the distance ShL for the low-strength portion 1*sh* are determined where that termination of the round (curved) section (edge of the curved section) which is more distant from the middle position 1mid of the side wall 1*bh* as determined along the height direction is an edge of the side wall 1*bh*.

Figure 9B:
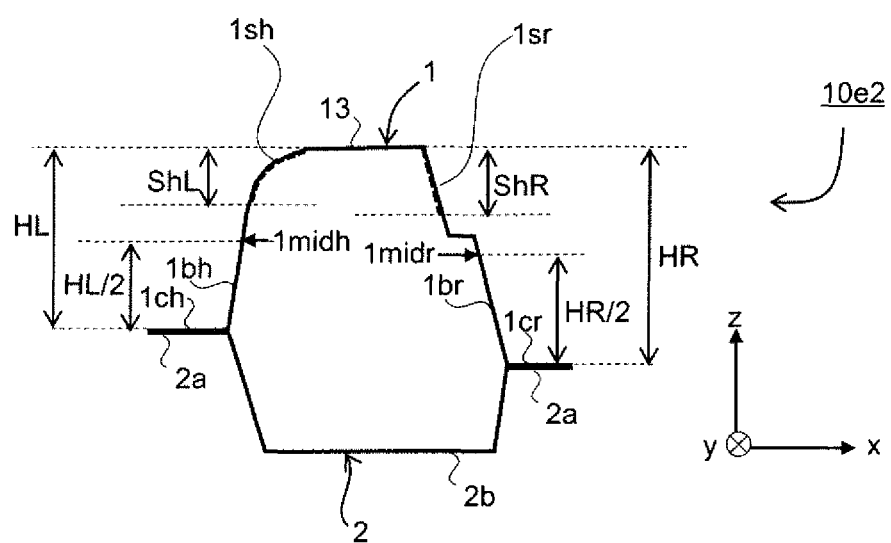
FIG. 9B is a cross-sectional view of a structural member according to a variation, with its closing plate modified.

FIG. 9B is a cross-sectional view of a structural member according to a variation, with its closing plate 2 modified. In the implementation shown in FIG. 9B, the closing plate 2 is shaped to protrude away from the hat member 1. More specifically, the closing plate 2 includes joints 2*a* joined to the flanges 1*cr* and 1*ch* of the hat member 1, and an intermediate portion 2*b* located between the joints. The intermediate portion 2*b* is shaped to protrude away from the hat member 1. In this implementation, a cross section of the closing plate 2 is hat-shaped. In FIG. 9B, the outer surface of the intermediate portion 2*b* is generally parallel to the outer surfaces of the joints 2*a*; alternatively, they may not be parallel.

Thus, as the closing plate 2 is shaped to protrude away from the hat member 1, the dimension of the structural member as measured in the height direction may be adjusted. The values relating to the height of the side wall relative to which the low-strength portion is positioned (H, HL and HR) do not vary depending on the dimension of the closing plate 2 as measured in the height direction. A cross section of the structural member 10*e*1 shown in FIG. 9B perpendicular to the longitudinal direction is not symmetrical with respect to the axis in the height direction; alternatively, it may be symmetrical, generally illustrated in FIG. 1A.

Figure 10:
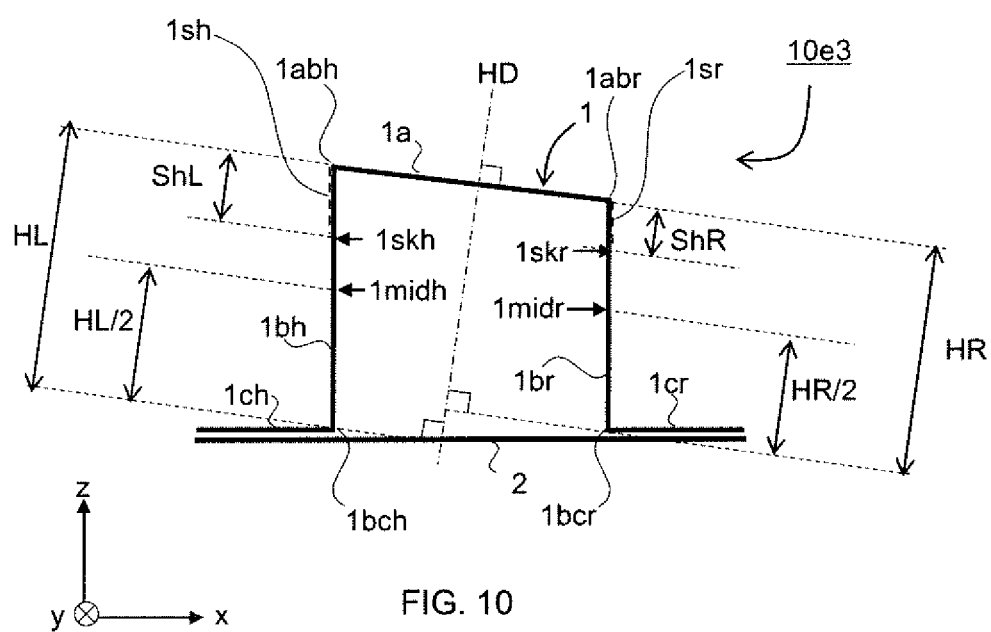
FIG. 10 shows a structural member with its top-surface portion inclined, illustrating the height direction of the side walls 1b.

FIG. 10 illustrates the height direction of the side walls 1*b* in an implementation where the top-surface portion 1*a* is inclined. In the structural member 10*e*3 shown in FIG. 10, the top-surface portion 1*a* of the hat member 1 is not parallel to the flanges 1*cr* and 1*ch*. Further, the one side wall 1*br* and the other side wall 1*bh* have different dimensions as measured in the z-direction. The height direction of the side walls 1*br* and 1*bh* is perpendicular to the top-surface portion 1*a*. The heights HL and HR of the side walls 1*br* and 1*bh* and the distances ShR and ShL between the one edge of the low-strength portion 1*sr* (first ridge 1*bcr*) and the one edge of the low-strength portion 1*sh* (first ridge 1*bch*) and the borders 1*skr* and 2*skh* are determined relative to the height direction of the side walls 1*br* and 1*bh*. Thus, the distances of the surface between the one edge of the surface of the side wall 1*br* (first ridge 1*abr*) and the one edge of the surface of the side wall 1*bh* (first ridge 1*anh*), on the one hand, and the other edges (second ridges 1*bcr* and 1*bch*) on the other hand are different from the heights HR and HL.

Figure 11A:
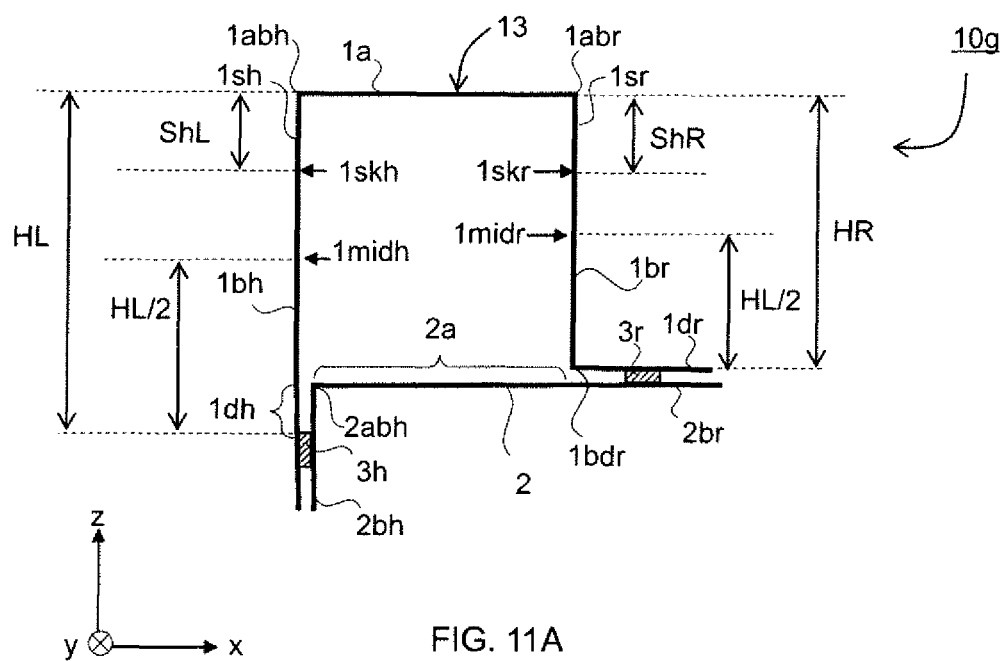
FIG. 11A is a cross-sectional view of a structural member according to a variation.
Figure 11B:
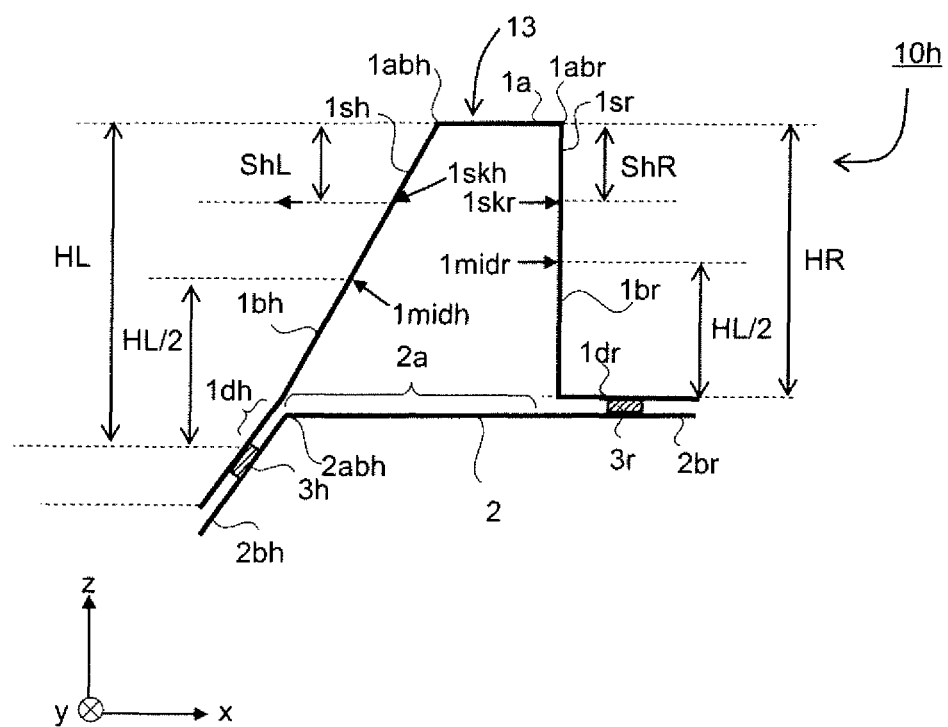
FIG. 11B is a cross-sectional view of a structural member according to a variation.
Figure 11C:
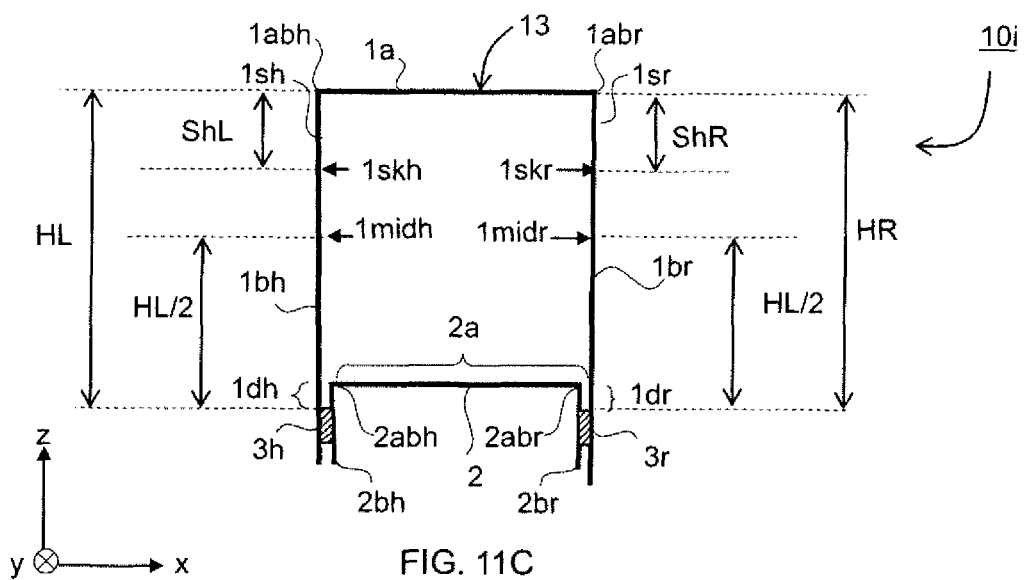
FIG. 11C is a cross-sectional view of a structural member according to a variation.
Figure 11D:
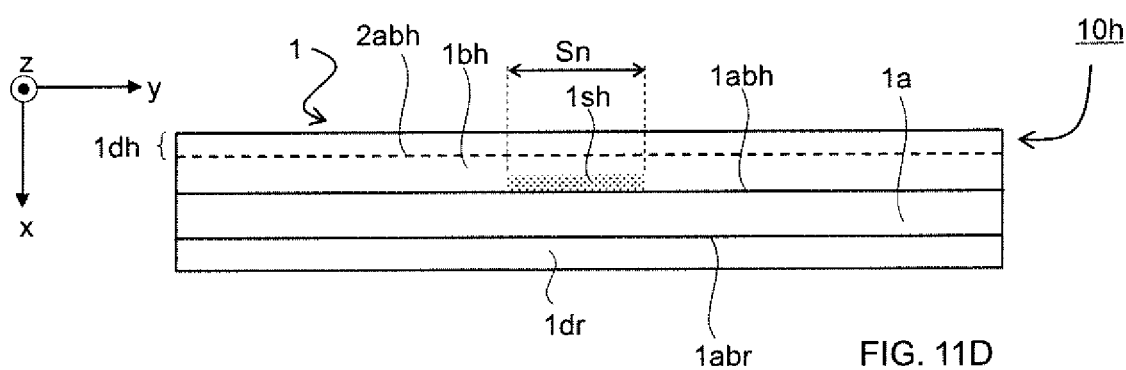
FIG. 11D is a plan view of the structural member shown in FIG. 11B.

FIGS. 11A and 11C are cross-sectional views of structural members according to variations of the present embodiment. FIGS. 11A to 11C are cross-sectional views of the structural members perpendicular to the longitudinal direction. FIG. 11D is a plan view of the structural member 10*h* shown in FIG. 11B as viewed in a z-direction. The implementations shown in FIGS. 11A and 11B relate to the fifth arrangement described above. The implementation shown in FIG. 11C relates to the fourth arrangement described above.

In the variations shown in FIGS. 11A to 11C, instead of a hat member including two flanges, a grooved member with no flange or a grooved member with one flange is used. The structural member 10 shown in FIGS. 1A to 1C is constructed such that the first and second ridges 1*ab* and 1*bc* on both edges of each side wall 1*b* contribute to the resistance to deformation due to a load in the direction perpendicular to the top-surface portion 1*a* (or bend stiffness). On the other hand, the variations shown in FIGS. 11A to 11C are constructed such that the first ridge and the joint located on both edges of at least one of the two side walls contribute to bend stiffness.

Each of the structural members 10*g*, 10*h* and 10*i* shown in FIGS. 11A to 11C includes a groove-shaped grooved member 13 and a closing plate 2 joined to the grooved member 13. The grooved member 13 shown in FIGS. 11A to 11C includes a top-surface portion 1*a*, two side walls 1*br* and 1*bh* extending from both edges of the top-surface portion 1*a*, and two joints 3*r* and 3*h* for joining the grooved member 13 to the closing plate 2. The two side walls 1*br* and 1*bh* face each other. The two joints 3*r* and 3*h* are located in portions of the grooved member 13 and closing plate 2 where they overlap. The joints 3*r* and 3*h* may be welds produced by spot welding or laser welding, for example. If sub-joints that are not continuous (i.e. discontinuous) are provided along the longitudinal direction of the grooved member 13 (i.e. direction in which the ridges extend), they are treated as a joint located where the sub-joints that are not continuous were connected. That is, a plurality of sub-joints disposed discontinuously are treated as a joint extending on a line connecting these sub-joints. The portions of the structural member located between a joint and the first ridge constitute a side wall. Two first ridges 1*abr* and 1*abh* are located between the top-surface portion 1*a* and the two side walls 1*br* and 1*bh*.

In the grooved member 13 shown in FIGS. 11A and 11B, the two side walls 1*br* and 1*bh* include a first side wall 1*br* and a second side wall 1*bh*. The first side wall 1*br* has a first edge adjacent to the top-surface portion 1*a* and a second edge opposite thereto that is bent. A flange 1*dr* extends from this bend. The flange 1*dr* overlaps the closing plate 2. The flange 1*dr* has a contact surface that is in contact with the closing plate 2. The flange 1*dr* and closing plate 2 are joined to each other at a joint 3*r*.

The first side wall 1*br* is located between one of the two first ridges, 1*abr*, and the flange 1*dr*. The second ridge 1*bdr* is located between the flange 1*dr* and the first side wall 1*br*. The second ridge 1*bdr* is an edge of the flange 1*dr*. The second ridge 1*bdr* extends in the same direction as the first ridges 1*abr* and 1*abh*, i.e. the longitudinal direction of the grooved member 13 (i.e. y-direction).

The height HR of the first side wall 1*br* is the height of the first side wall 1*br* as measured in the direction perpendicular to the top-surface portion 1*a*, i.e. the distance between the first and second ridges 1*abr* and 1*bdr* as measured in the direction perpendicular to the top-surface portion 1*a*. The middle 1midr of the first side wall 1*br* as determined along the direction perpendicular to the top-surface portion 1*a* is the middle between the first and second ridges 1*abr* and 1*bdr* as determined along the direction perpendicular to the top-surface portion 1*a*.

The second side wall 1*bh* is located between the other one of the two first ridges, 1*abh*, and the joint 3*h*. The second side wall 1*bh* is not bent. A portion of the second side wall 1*bh* adjacent to the joint 3*h* overlaps the closing plate 2. A portion of the second side wall 1*bh* adjacent to the joint 3*h* has a contact surface 1*dh* that is in contact with the closing plate 2. The second side wall 1*bh* extends in the same direction as the contact surface 1*dh*.

The height HL of the second side wall 1*bh* is the distance between the first ridge 1*abh* and the joint 3*h* as measured in the direction perpendicular to the top-surface portion 1*a*. The middle 1midh of the first side wall 1*bh* as determined along the direction perpendicular to the top-surface portion 1*a* is the middle between the first ridge 1*abh* and joint 3*h* as determined along the direction perpendicular to the top-surface portion 1*a*.

In the grooved member 13 shown in FIG. 11C, the two side walls 1*br* and 1*bh* are located between the first ridges 1*abr* and 1*abh*, respectively, and the two joints 3*r* and 3*h*, respectively. The height HR of one of the two side walls, 1*br*, is the distance between the first ridge 1*abr* and joint 3*r* as measured in the direction perpendicular to the top-surface portion 1*a*. The height HL of the other one of the two side walls, 1*bh*, is the distance between the first ridge 1*abh* and joint 3*h* as measured in the direction perpendicular to the top-surface portion 1*a*.

In each of the grooved members 13 shown in FIGS. 11A to 11C, each of the side walls 1*br* and 1*bh* includes a low-strength portion 1*sr* or 1*sh* and a high-strength portion having a higher yield strength than the low-strength portion 1*sr* or 1*sh*. Each of the low-strength portions 1*sr* and 1*sh* of the side walls 1*br* and 1*bh* extends from the first edge of the side wall (i.e. first ridge 1*abr* or 1*abh*) to the border 1*skr* or 1*skh* between the low-strength portion 1*sr* or 1*sh* and the high-strength portion. Each of the distance ShR between the first edge of the side wall 1*br* and the border 1*skr* and the distance ShL between the first edge of the side wall 1*bh* and the border 1*skh*, as measured in the height direction of the side walls, is 20 to 40% of the high HR or HL of the side walls. Further, as shown in FIG. 11D, as measured in the longitudinal direction of the side wall 1*bh* (i.e. direction in which the first ridge 1*abh* extends), the low-strength portion 1*sh* extends a distance equal to or larger than the height HL of the side wall 1*bh*. In each of the side walls 1*br* and 1*bh* in FIGS. 11A to 11C, the dimension of the low-strength portion 1*sh* or 1*sh* as measured in the longitudinal direction is equal to or larger than the height HR or HL of the side wall 1*bh* or 1*bh*. The yield strength of the low-strength portions 1*sr* and 1*sh* of the side walls 1*br* and 1*bh* is 60 to 85% of the yield strength of the side walls 1*br* and 1*bh* as measured at the middle positions 1midr and 1midh as determined along the height direction.

That is, each of the low-strength portions 1*sr* and 1*sh* of the side walls 1*br* and 1*bh* shown in FIGS. 11A to 11C extends from the first ridge 1*abr* or 1*abh* to a position at a distance of 20 to 40% of the height HR or HL of the side wall 1*br* or 1*bh* as measured in the height direction of the side walls. As measured in the direction in which the first ridges 1*abr* and 1*abh* extend (i.e longitudinal direction of the side walls 1*br* and 1*bh*), each of the low-strength portions 1*sr* and 1*sh* extends a distance equal to or larger than the height HR or HL of the side wall 1*br* or 1*bh*.

In the implementation shown in FIG. 11A, the first and second side walls 1*br* and 1*bh* are parallel to each other. On the other hand, in the implementation shown in FIG. 11B, the first and second side walls 1*br* and 1*bh* are not parallel to each other. In the implementation shown in FIG. 11B, the first and second side walls 1*br* and 1*bh* extend such that their distance increases as they go away from the top-surface portion 1*a*. In this implementation, the first side wall 1*br* extends in the direction perpendicular to the top-surface portion 1*a*. The second side wall 1*bh* extends in a direction with an angle relative to the axis perpendicular to the top-surface portion 1*a*. The flange 1*dr* extends outward from the second edge of the first side wall 1*br* adjacent to the closing plate 2. A structural member having the cross section shown in FIG. 11A may be used as an A-pillar, for example.

In each of the implementations shown in FIGS. 11A and 11B, the closing plate 2 has a bend that is bent away from its plane. The direction in which the ridge 2*abh* formed along the bend of the closing plate 2 extends is the same in which the border between the contact surface 1*dh* of the side wall 1*bh* that is in contact with the closing plate 2 and the surface that is not in contact with the closing plate 2 extends. The direction in which the ridge 2*abh* formed along the bend of the closing plate 2 extends may be the same in which the first ridge 1*abh* extends (see FIG. 11D).

In the implementation shown in FIG. 11C, none of the two side walls 1*br* and 1*bh* is bent. That is, the contact surface 1*dr* of the side wall 1*br* that is in contact with the closing plate 2 extends in the same direction as the side wall 1*br*. The contact surface 1*dh* of the side wall 1*bh* that is in contact with the closing plate 2 extends in the same direction as the side wall 1*bh*.

The closing plate 2 includes two contact portions 2*br* and 2*bh* overlapping and in contact with the grooved member 13, and an intermediate portion 2*a* between the two contact portions 2*br* and 2*bh*. The portions between the intermediate portion 2*a* and the two contact portions 2*br* and 2*bh* are bent. The direction in which the ridges 2*abr* and 2*abh* formed between the intermediate portion 2*a* and the two contact portions 2*br* and 2*bh* extend is the same in which the borderlines between the contact surfaces 1*dr* and 1*dh* of the side walls 1*br* and 1*bh* that are in contact with the closing plate 2 and the surfaces of the side walls 1*br* and 1*bh* that are not in contact with the closing plate 2 extend.

The structural members 10*g*, 10*h* and 10*i* shown in FIGS. 11A to 11C provide the same effects as the structural member 10 shown in FIGS. 1A to 1C. The joints 3*r* and 3*h* are not limited to welds. For example, the joints may be fasteners such as screws, adhesives or brazes.

[Embodiment 2]

Figure 12A:
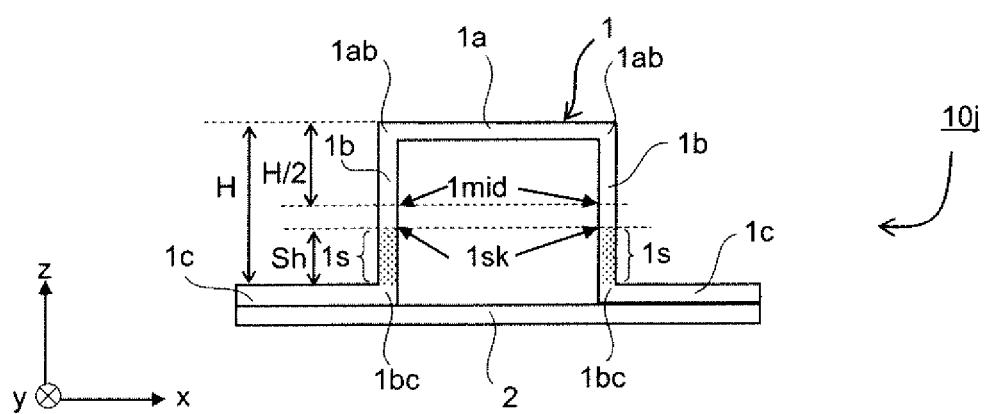
FIG. 12A is a cross-sectional view of a structural member according to another embodiment.
Figure 12B:
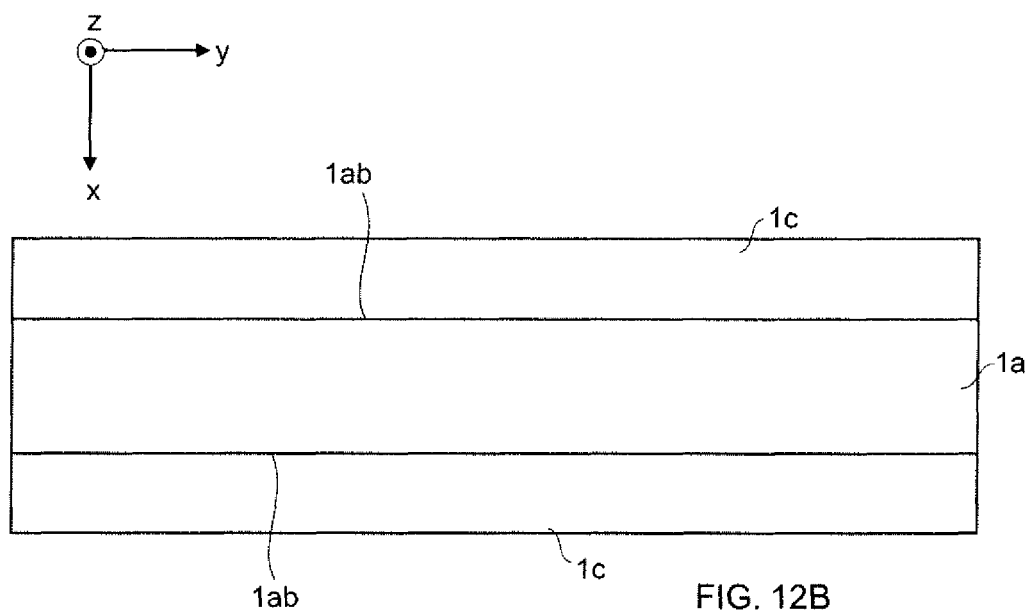
FIG. 12B is a plan view of the structural member shown in FIG. 12A.

Embodiment 2 relates to the third arrangement described above. FIG. 12A is a cross-sectional view of a structural member of the present embodiment; FIG. 12B is a plan view of the structural member shown in FIG. 12A; and FIG. 12C is a side view of the structural member of FIG. 12A.

Figure 12C:
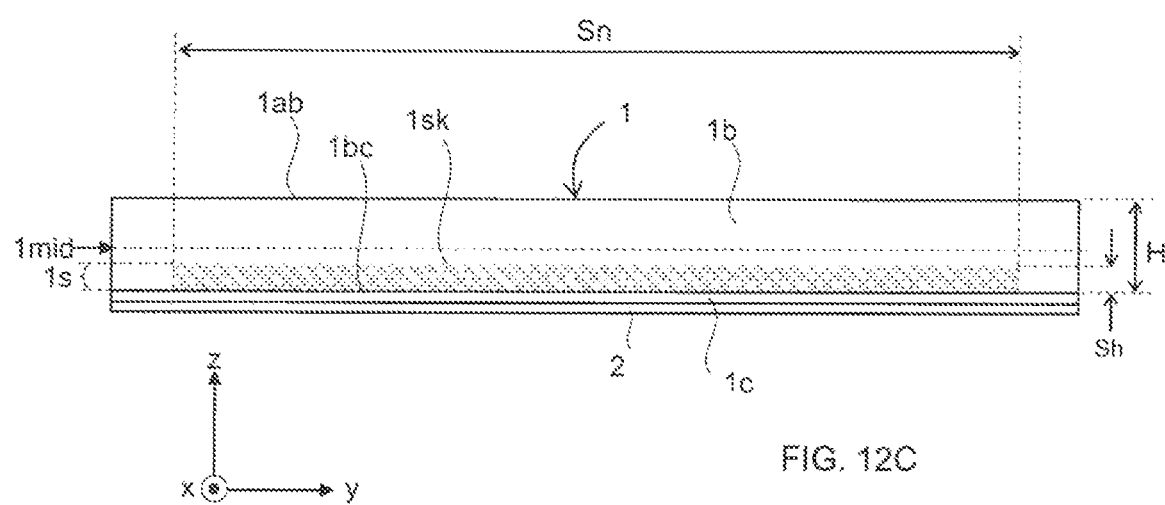
FIG. 12C is a side view of the structural member shown in FIG. 12A.

In the structural member 10*j* shown in FIGS. 12A to 12C, a low-strength portion 1*s* extends from the second edge of each side wall 1*b* adjacent to the closing plate 2 (i.e. second ridge 1*bc*) to a position at a distance Sh for the side wall 1*b* as determined along the height direction, and has a dimension equal to or larger than the height H of the side wall 1*b* as measured in the longitudinal direction. This will increase the absorption efficiency for impact energy from an impact applied to the closing plate 2.

The structural member 10*j* shown in FIGS. 12A to 12C includes a hat member 1 and a closing plate 2 joined to the hat member 1. As shown in FIG. 12A, the hat member 1 includes a top-surface portion 1*a*, two side walls 1*b* extending from both edges of the top-surface portion 1*a* and facing each other, and two flanges 1*c* extending from the respective side walls 1*b* outwardly as determined along the direction in which the side walls are arranged. The two flanges 1*c* are joined to the closing plate 2.

The portions of the hat member 1 of the structural member 10*j* that are located between the top-surface portion 1*a* and the two side walls 1*b* are bent. The bends between the top-surface portion 1*a* and the two side walls 1*b* form two first ridges 1*ab*. The portions between the two flanges 1*c* and the two side walls 1*b* are bent. The bends between the two flanges 1*c* and the two side walls 1*b* form two second ridges 1*bc*. Each of the two side walls 1*b* is located between a first ridge 1*ab* and a second ridge 1*bc*.

As shown in FIG. 12C, the direction in which each second ridge 1*ab* extends is the same as the longitudinal direction of the structural member 10*j*. The longitudinal direction of the structural member 10*j* is the same as the longitudinal direction of the side walls 1*b*, and the same as the longitudinal direction of the top-surface portion 1*a*. In the implementation shown in FIG. 12C, the direction in which the second ridge 1*ab* extends is the same in which the first ridge 1*ab* extends.

In the hat member 1*a* shown in FIGS. 12A to 12C, each side wall 1*b* includes a low-strength portion 1*s* and a high-strength portion having a higher yield strength than the low-strength portion 1*s*. The low-strength portion 1*s* of the side wall 1*b* extends from the second edge of the side wall 1*b* adjacent to the closing plate 2 (i.e. second ridge 1*bc*) to the border 1*sk* between the low-strength portion 1*s* and high-strength portion. The distance Sh between the second edge of the side wall 1*b* (i.e. second ridge 1*bc*) and the border 1*sk* as measured in the height direction of the side wall 1*b* is 20 to 40% of the height H of the side wall 1*b*. Further, as shown in FIG. 12C, the low-strength portion 1*s* extends a distance equal to or larger than the height H of the side wall 1*b* as measured in the longitudinal direction of the side wall 1*b* (i.e. direction in which the first ridge 1*ab* extends). That is, the dimension of the low-strength portion 1*s* as measured in the longitudinal direction of the side wall 1*b* is larger than the height H of the side wall 1*b*. The yield strength of the low-strength portion 1*s* of each side wall 1*b* is 60 to 85% of the yield strength of the high-strength portion as measured at the middle position 1mid of the side wall 1*b* as determined along the height direction.

In other words, the low-strength portion 1*s* of each side wall 1*b* shown in FIGS. 12A to 12C extends from the second ridge 1*bc* to a position at the distance of 20 to 40% of the height H of the side wall 1*b* as determined along the height direction of the side wall 1*b*. As determined along the direction in which the second ridge 1*bc* extends (i.e. longitudinal direction of the side wall 1*b*), the low-strength portion 1*s* extends a distance equal to or larger than the height H of the side wall 1*b*.

In the present embodiment, the height direction of each side wall 1*b* is the direction perpendicular to the closing plate 2. More specifically, the direction perpendicular to the closing plate 2 is the direction perpendicular to the plane of the surface of the closing plate 2. If the closing plate 2 has a protrusion, recess, step or curved portion, the direction perpendicular to an imaginary plane connecting the two second ridges 1*bc* represents the direction perpendicular to the closing plate 2. The height H of the side wall 1*b* is the same as the distance between the first and second ridges 1*ab* and 1*bc* as measured in the direction perpendicular to the closing plate 2.

In the structural member 10*j* of the present embodiment, for example, the deformation behavior found when an impact is applied to the closing plate 2 in a z-direction tends to show a cross-section crush, as shown in FIG. 4. This will reduce the extent of bend deformation in the direction perpendicular to the closing plate 2. Thus, when receiving an impact, the structural member 10*j* can absorb larger impact energy with a smaller deformation. That is, the structural member 10*j* can efficiently absorb impact energy.

Preferably, the distance Sh for the low-strength portion 1*s* is not larger than 35% the height H of the side wall 1*b*, and more preferably not larger than 30%. Further, the distance Sh is preferably not smaller than 25% of the height H of the side wall 1*b*. The ratio of the strength of the low-strength portion 1*s* of the side wall 1*b* to the strength at the middle position 1mid as determined along the height direction (i.e. strength ratio) is preferably not higher than 83%, and more preferably not higher than 80%. The strength ratio is preferably not lower than 70%.

The variations of Embodiment 1 can be applied to Embodiment 2.

In Embodiments 1 and 2, the first ridges and/or second ridges may be curved. For example, the first ridges and/or second ridges may be curved in a height direction of the side walls, or may be curved in a direction perpendicular to the side walls. Further, the height of a side wall (i.e. distance between the first and second ridges) may vary along the longitudinal direction (i.e. direction in which the first ridge extends). If the height of a side wall varies depending on the position as determined along the longitudinal direction, the height of the side wall, which provides a reference for the distance Sh for the low-strength portion as measured in the height direction and the distance Sn as measured in the longitudinal direction, is the average height of the portions of the side wall that have the low-strength portion.

[Applications in Vehicles]

A vehicle including the structural member 10 of Embodiment 1 described above (including the structural members 10*e*, 10*e*2, 10*e*3, 10*g*, 10*h*, 10*i* and other variations; similar definitions apply hereinafter) is included in embodiments of the present invention. In the vehicle, the structural member 10 may be positioned such that the top-surface portion 1*a* is located outward with respect to the vehicle and the closing plate 2 is located inward with respect to the vehicle. That is, the structural member 10 is mounted such that the surface for releasing impacts is located outward with respect to the vehicle. Thus, when the structural member 10 receives an impact from outside the vehicle, the extent of protrusion thereof toward the inside of the vehicle is reduced. This will reduce the possibility of the structural member 10 contacting a device or a person located inside the vehicle. For example, it will avoid the structural member being sharply bent toward the passenger compartment upon a crash. This will improve safety.

A vehicle including the structural member 10*j* of Embodiment 2 described above is included in embodiments of the present invention. In the vehicle, the structural member 10*j* may be positioned such that the top-surface portion 1*a* is located inward with respect to the vehicle and the closing plate 2 is located outward with respect to the vehicle. That is, the structural member 10*j* is mounted such that the surface for receiving impacts is located outside the vehicle. Thus, when the structural member 10 receives an impact from outside the vehicle, the extent of protrusion thereof toward the inside of the vehicle is reduced.

The structural members 10 and 10*j* may be used with two positions separate in the longitudinal direction being supported. In such implementations, the structural member 10 or 10*j* includes two connections with which it is connected to another member. That is, the structural member 10 or 10*j* is supported by another member at the connections. A connection may also be referred to as support. The connections are provided on at least one of the side walls 1*b*, top-surface portion 1*a* and closing plate 2.

The structural member 10 or 10*j* is fixed to another member at the connections. The connections of the structural member 10 or 10*j* are joined to the other member through fasteners or by welding, for example. Three or more connections may be provided.

The connections may be constructed to be inserted into the interior space of the structural member 10 or 10*j* and support the structural member 10 or 10*j*. For example, in the case of the structural member 10, a through-hole may be formed in the closing plate 2 and the other member may be inserted through the through-hole to join an end of the other member to an inner surface of the top-surface portion 1*a*. In this way, the connections may be provided inward of the top-surface portion 1*a* of the structural member 10 with respect to the member. In the case of the structural member 10*j*, a through-hole may be formed in the top-surface portion 1*a* and the other member may be inserted through the through-hole to join an end of the other member to the inner surface of the closing plate 2. In this way, the connections may be provided inward of the closing plate 2 of the structural member 10*j* with respect to the member.

The low-strength portions 1s are preferably located between the two connections. That is, it is preferable that at least part of each low-strength portion 1*s* is located in portions of the associated side wall 1*b* between the two connections. This will reduce bend deformation found when an impact is applied to portions of the structural member that are not supported by the connections. Further, it is desirable that the low-strength portions 1s be located in the middle between the two connections. That is, it is preferable that the low-strength portions 1*s* are provided in portions of the side walls 1*b* located in the middle between the two connections. This will increase impact-energy absorption efficiency at positions that are likely to receive strong impacts. As a result, the extent of bend deformation of the structural member due to an impact will be reduced.

Further, it is desirable that the low-strength portions 1s be located in the middle of the structural member 10 or 10*j* as determined along the longitudinal direction for the following reasons: Portions of the structural member 10 or 10*j* that are in the vicinity of the ends, distant from the middle as determined along the longitudinal direction, are connected to another member. Thus, regardless of whether there are connections or not, the bend deformation of portions of the structural member 10 or 10*j* that will have the largest moment under an impact and are most likely to break (i.e. portions of the structural member that are in the middle as determined along the longitudinal direction or the intermediate portions between the connections) will be effectively prevented.

Thus, the structural members 10 and 10*j* may be used as high-strength structural members for vehicles. Structural members for vehicles include, for example, A-pillars, B-pillars, side sills, roof rails, floor members, front side members and other members constituting parts of a vehicle body, and door impact beams, bumpers and other members that are attached to a vehicle body to protect devices and passengers in the vehicle from an external impact. Structural members for vehicles absorb impact energy upon a crash of the vehicle.

Figure 13:
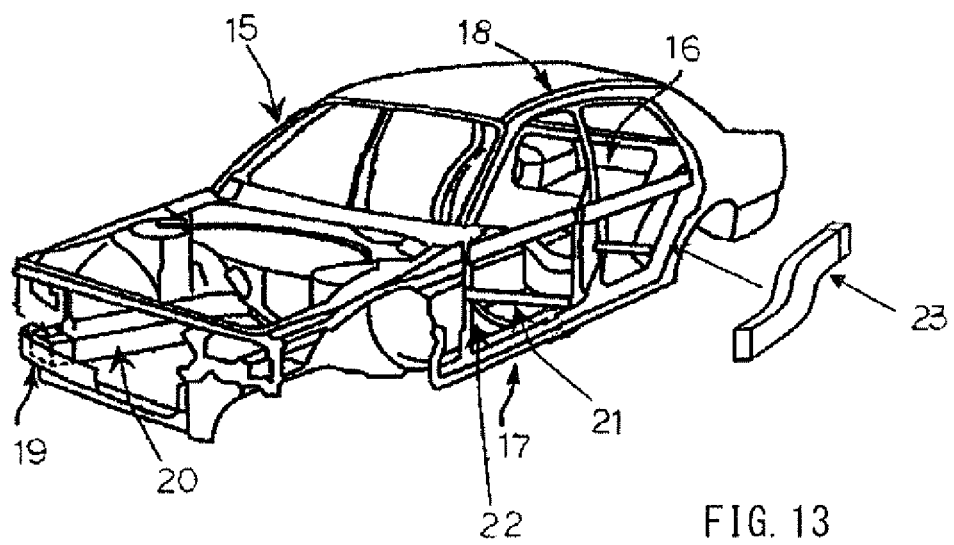
FIG. 13 shows an example of the structural member deployed in a vehicle.

FIG. 13 illustrates exemplary structural members positioned in a vehicle. In the implementation shown in FIG. 13, the A-pillars 15, B-pillars 16, side sills 17, roof rails 18, bumper 19, front side members 20, door impact beam 21, floor members 22 and rear side members 23 are used as structural members for vehicles. In at least one of these structural members for vehicles, low-strength portions 1*s* similar to those in the structural members 10 and 10*j* discussed above may be provided.

Figure 14:
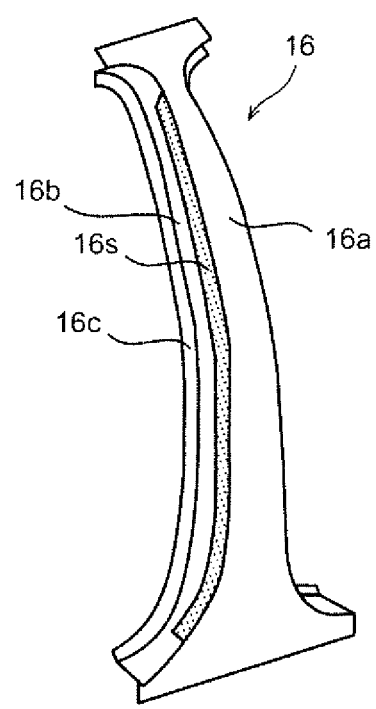
FIG. 14 shows a B-pillar implemented by the structural member according to an embodiment.

FIG. 14 shows a B-pillar 16 implemented by the structural member according to an embodiment. In the implementation shown in FIG. 14, similar to the structural member 10, the B-pillar 16 includes a top-surface portion 16*a*, a pair of side walls 16*b*, a pair of flanges 16*c* and a closing plate (not shown). The top-surface portion 16*a* of the B-pillar 16 is located outward with respect to the vehicle. The pair of side walls 16*b* extend from both edges of the top-surface portion 16*a* as determined along a direction perpendicular to the longitudinal direction and face each other. Each side wall 16*b* has a first edge adjacent to the top-surface portion 16*a* and the second edge opposite thereto, and the flanges 16*c* extend from these second edges. The closing plate (not shown) is joined to the face of each flange 16*c* opposite to the face adjacent to the top-surface portion 16*a*, i.e. the face located inward with respect to the vehicle. A low-strength portion 16*s* is provided in each side wall 16*b* and located adjacent to the top-surface portion 16*a*. The low-strength portion 16*s* extends from the border between the top-surface portion 16*a* and side wall 16*b* (i.e. shoulder) to a position at a distance of 20 to 40% of the height of the side wall 16*b*. The yield strength of the low-strength portion is 60 to 85% of the yield strength of the other portions (i.e. yield strength of the side wall 16*b* as measured at the middle position as determined along the height direction).

Structural members for vehicles that can absorb impact energy may be generally categorized as those that can be deformed as they are axially compressed and those that can be deformed as they are sharply bent. Those that can be sharply bent absorb impact energy by sharp bending or cross-section crushing. Parts such as B-pillars and side sills are required to have higher impact-energy absorption efficiency by being constructed by high-strength materials. As such, the above-described effects are significant if the structural member 10 according to an embodiment is made of a super-high-strength steel in which the tensile strength of each side wall 1*b* as measured at the middle position 1mid as determined along the height direction (i.e. tensile strength of portions other than the low-strength portion) is 980 MPa or higher (or a yield strength of 500 MPa or higher). Still greater effects can be achieved if the strength of each side wall 1*b* of the structural member 10 as measured at the middle position 1mid (i.e. strength of portions other than the low-strength portion 1*s*) is expressed as a tensile strength of 1 GPa or higher.

The use of the structural members 10 and 10*j* is not limited to applications in four-wheel vehicles such as automobiles, as shown in FIG. 13, and they may be used as structural members for two-wheel vehicles, for example. Further, the use of the structural members 10 and 10*j* is not limited to vehicle applications. For example, the structural members 10 and 10*j* may be structural members of impact-resistant containers, constructions, ships or aircraft.

[Manufacturing Process]

The structural member 10 or 10*j* may be formed entirely from one and the same material. The structural member 10 or 10*j* may be formed from a steel plate, for example. The process of manufacturing the structural member 10 or 10*j* includes the step of fabricating a hat member 1 (or grooved member 13) having low-strength portions 1s, the step of fabricating a closing plate 2, and the step of joining the hat member 1 and closing plate 2. The step of fabricating the hat member 1 includes the sub-step of providing differences in strength to the material to form low-strength portions.

The forming of the low-strength portions is not limited to a particular method. For example, a hat member 1 including a hardened portion may be created by using roll forming to deform a steel plate into a hat shape as viewed in a cross section, and locally heating and quenching the material by methods such as laser or high-frequency-wave heating. In this case, the portions that have not quenched have relatively low strengths and provide a low-strength portions. Alternatively, the entire hat member 1 may be strengthened by quenching before the member is partially annealed to form low-strength portions.

Alternatively, hot pressing (or hot stamping) may be used to fabricate the structural member 10 or 10*j*. During the step of hot pressing, the conditions for heating or cooling may be varied for limited areas within the mold to create low-strength portions in the material. For example, a steel plate may be heated to temperatures at which the steel provides an austenite single-phase region (i.e. Ac3 temperature or higher) and then may be quenched while the steel is shaped using a mold. Cooling rate may be varied during this process such that rapidly cooled portions generally provide a hard martensite microstructure and slowly cooled portions provide a soft multiphase microstructure with ferrite and pearlite or a bainite microstructure. Thus, slowly cooled portions provide low-strength portions.

The manufacture of the structural member 10 or 10*j* is not limited to the above-described exemplary method. For example, tailored blank or other known methods may be used to provide a structural member 10 or 10*j* with low-strength portions 1s.

EXAMPLES

Figure 15:
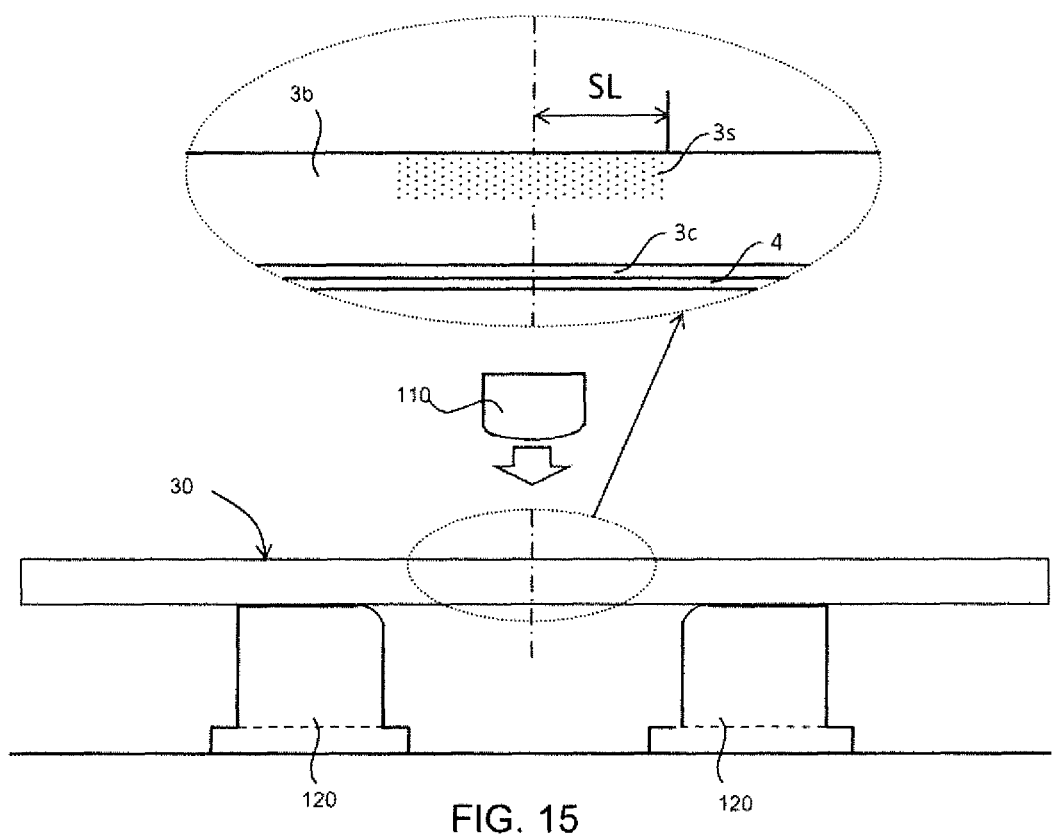
FIG. 15 schematically shows an analysis model (upright-hat model) in simulations.

For the present examples, the deformation of structural members each having a hat member and a closing plate, found when an indenter was caused to hit them, was analyzed using simulations. FIG. 15 schematically shows the construction of an analysis model for the simulations. In the simulations, with a structural member 30 placed on two stands 120 to stretch over and between them, the indenter 110 was caused to hit the middle portion of the structural member 30 as determined along the longitudinal direction and the resulting deformation behavior was analyzed. The radius of curvature of the indenter 110 was 150 mm, and the initial velocity of the indenter was 4 m/sec. The mass of the indenter 110 was 350 kg.

Figure 16:
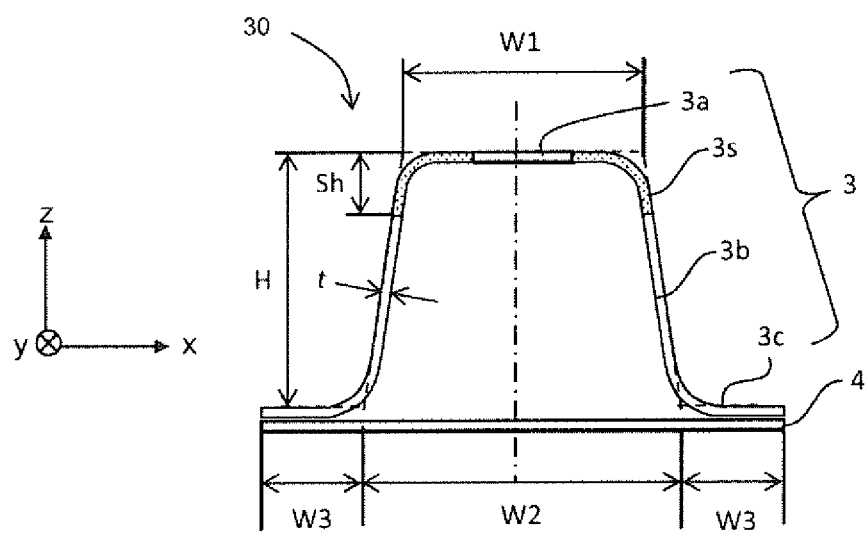
FIG. 16 illustrates various dimensions of the structural members used in the simulations.

FIG. 16 illustrates various dimensions of the structural member 30 used in the simulations as viewed in a cross section perpendicular to the longitudinal direction. The structural member 30 includes a hat member 3 and a closing plate 4. The hat member 3 includes a top-surface portion 3*a*, a pair of side walls 3*b* and a pair of flanges 3*c*. The side walls 3*b* extend from both edges of the top-surface portion 3*a* and face each other. Each side wall 3*b* has a first edge adjacent to the top-surface portion 3*a* and a second edge opposite thereto, and each flange 3*c* extends from the second edge of the associated side wall 3*b* outwardly as determined along the direction in which the side walls 3*b* are arranged. The closing plate 4 is fixed to the pair of flanges 3*c*. Each side wall 3*b* has a low-strength portion 3*s* extending from the first edge to a position at a distance Sh.

In FIG. 16, H=50 mm, W1=50 mm, W2=65 mm, W3=40 mm, and t=1.4 mm. Impact simulations were conducted where the distance Sh for the low-strength portion 3*s* was varied. Impact simulations were conducted where the strengths of the low-strength portions 3*s* and the other portions were changed. The length SL of one-half of the dimension of the low-strength portion 3*s* as measured in the longitudinal direction (see FIG. 15) was H/2.

Figure 17:
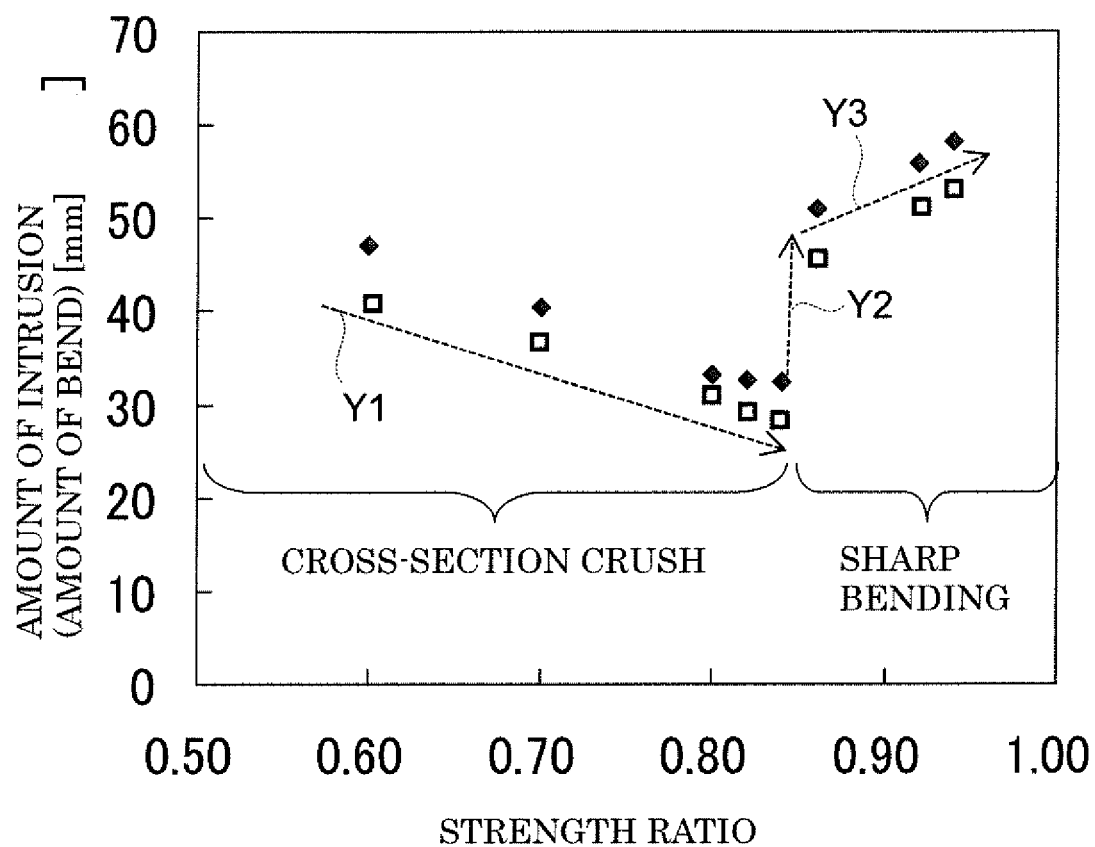
FIG. 17 is a graph of the amount of the deformation accompanied by a bend under an impact, with different strength ratios of the low-strength portions to the other portions.

FIG. 17 is a graph of the amount of the deformation accompanied by a bend under an impact load, with different strength ratios of the low-strength portions 3*s* to the other portions, where Sh=(2/5)H. In FIG. 17, the vertical axis indicates the amount of intrusion (or protrusion) of a structural member as measured in the direction perpendicular to the top-surface portion 3*a* (i.e. z-direction). The horizontal axis indicates the ratio of the strength of the low-strength portion 3*s* to the strength of the other, high-strength portions (or middle portion of each side wall 3*b* as determined along the height direction) (strength ratio=strength of low-strength portions/strength of high-strength portions). In the graph of FIG. 17, the rhombuses plotted indicate the values resulting when the yield strength of the high-strength portions was 120 kgf and the squares plotted indicate the values resulting when the yield strength of the high-strength portions was 145 kgf.

In the strength ratio section between 0.60 and 0.85, the amount of intrusion decreased as the strength ratio increased (arrow Y1). In this section, the manner of deformation was cross-section crush, as shown in FIG. 4. In this section, when the strength of the low-strength portions was low (i.e. the strength ratio was 0.60 or lower), the amount of intrusion was large even though cross-section crush was exhibited, and was substantially equal to the amount of intrusion found when the strength ratio exceeded 0.85. When the strength ratio exceeded 0.85, the amount of intrusion rapidly increased (arrow Y2). When the strength ratio was increased from 0.85, the amount of intrusion increased as the strength ratio increased (arrow Y3). This is presumably because, at the strength ratio of 0.85, the manner of deformation changed from cross-section crush as shown in FIG. 4 to bending as shown in FIG. 3. Thus, when the strength of the low-strength portions was too high (strength ratio was high), the member was sharply bent for deformation, and the amount of intrusion increased. The results of FIG. 17 demonstrate that, in order to reduce the amount of intrusion from bending deformation due to an impact, the strength ratio is preferably in the range of 60 to 85%, and the strength ratio is preferably in the range of 70 to 85%.

Table 1 provided below lists deformation behaviors found when the strength ratio was 0.83 (i.e. the yield strength of the low-strength portions was YP 100 MPa and the yield strength of the other portions was YP 120 MPa) and the distance Sh for the low-strength portion was changed. In Table 1, an up arrow indicates the same value as that in the row directly above. A circle (◯) in the column for deformation behavior indicates cross-section crush as shown in FIG. 4, and a cross (x) indicates sharp bending as shown in FIG. 3.

TABLE 1

| Case | Sh | Deformation Behavior |
|------|------|------|
| 1 | 0 | X |
| 2 | H/2 | X |
| 3 | 2H/5 | ○ |
| 4 | H/3 | ○ |
| 5 | H/5 | ○ |
| 6 | H/10 | X |

According to the results shown in Table 1, the deformation behavior was sharp bending (see FIG. 3) when no low-strength portion was provided (Sh=0) and when Sh=H/2 (Sh was 50% of H) and Sh=H/10 (Sh was 10% of H). The deformation behavior was cross-section crush (see FIG. 4) when Sh=2H/5 (Sh was 40% of H), Sh=H/3 (Sh was about 33% of H) and Sh=H/5 (Sh was 20% of H). These results demonstrate that the deformation behavior was cross-section crush and the amount of intrusion was minimized when the distance Sh for the low-strength portion 3s beginning with the first edge of the side wall 3b which is adjacent to the top-surface portion 3a was 20 to 40% of the height H of the side wall 3b.

Figure 18:
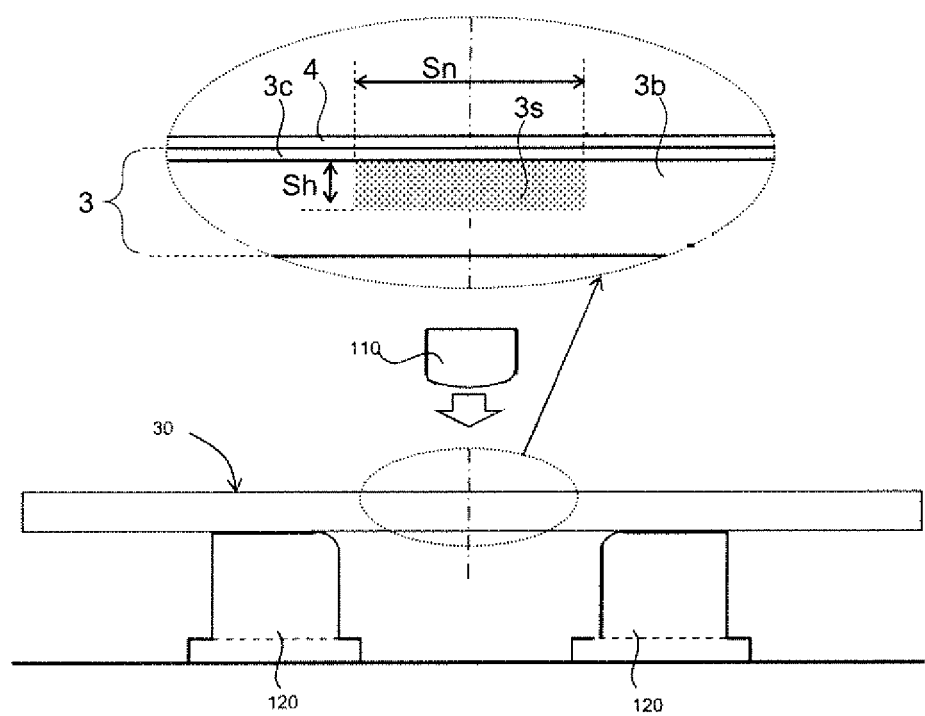
FIG. 18 schematically shows an analysis model (reversed-hat model) in simulations.

Further simulations were conducted with different surfaces which the indenter 110 was caused to hit and with different dimensions SL of the low-strength portion 3s as measured in the longitudinal direction. FIG. 18 schematically shows the construction of an analysis model in the simulations. In the model shown in FIG. 18, the structural member 30 was placed on two stands 120 so as to stretch over and between them such that the hat member 3 was located downward and the closing plate 4 was placed upward. The middle of the structural member 30 as determined along the longitudinal direction was located at the middle between the two stands 120. The indenter 110 was caused to hit the middle portion of the closing plate 4 as determined along the longitudinal direction. In the model shown in FIG. 18, each of the pair of side walls 3b included a low-strength portion 3s extending from the second edge thereof adjacent to the closing plate 4 to a position at a distance Sh.

Simulations were conducted for the model shown in FIG. 15 where the indenter 110 was caused to hit the hat member (hereinafter referred to as upright-hat model) and the model shown in FIG. 18 where the indenter 110 was caused to hit the closing plate 4 (hereinafter referred to as reversed-hat model). More specifically, the upright-hat model and reversed-hat model were analyzed where the dimension of the low-strength portion 3s as determined along the height direction Sh=H/3 and the dimension thereof as determined along the longitudinal direction SL was varied: SL-0, H/2 and H. That is, simulations were conducted under the following conditions, case 1 to case 6:

case 1: upright-hat model, SL=0, Sh=0 (without a low-strength portion)
case 2: upright-hat model, SL=H/2, Sh=H/3
case 3: upright-hat model, SL=H, Sh=H/3
case 4: reversed-hat model, SL=0, Sh=0 (without a low-strength portion)
case 5: reversed-hat model, SL=H/2, Sh=H/3
case 6: reversed-hat model, SL=H, Sh=H/3

Figure 19:
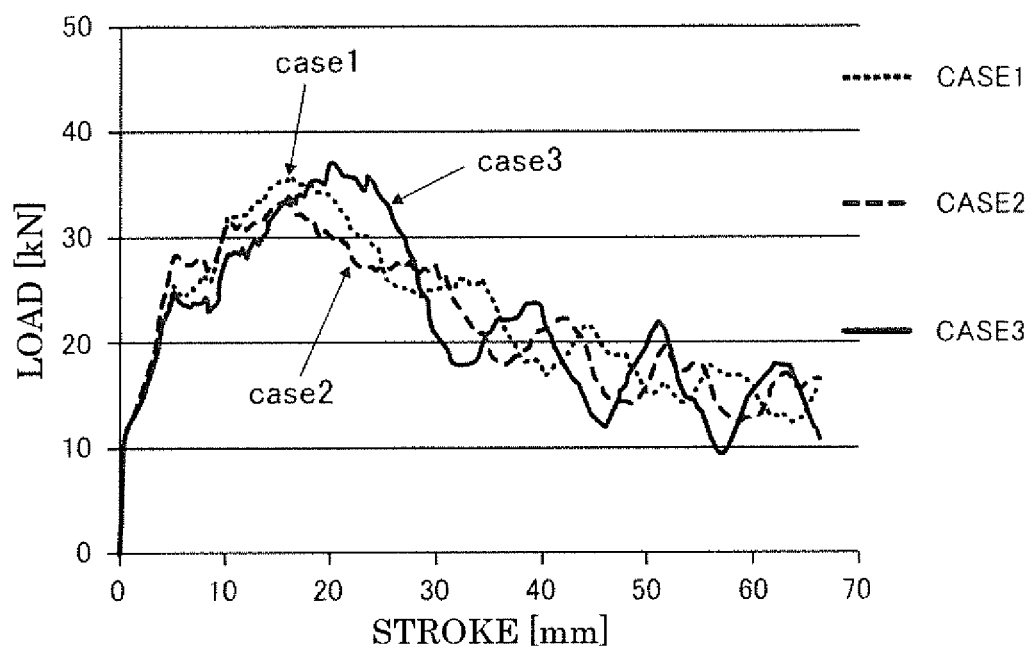
FIG. 19 is a graph showing the results of an analysis of the simulations of the upright-hat model.
Figure 20:
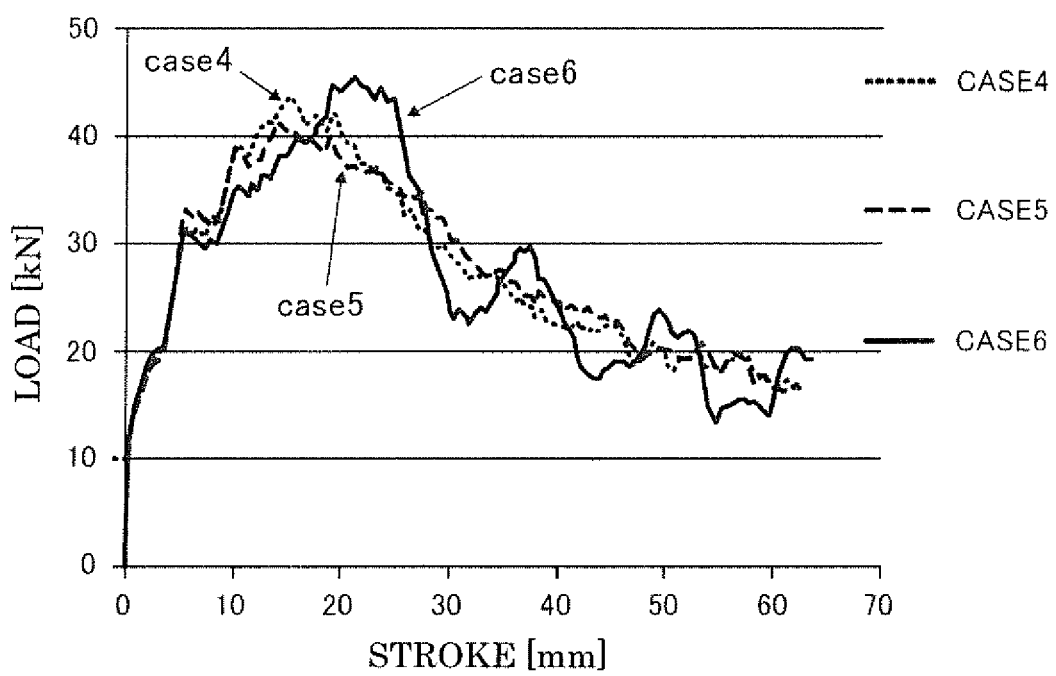
FIG. 20 is a graph showing the results of an analysis of the simulation of the reversed-hat model.

FIGS. 19 and 20 are graphs showing the analysis results for cases 1 to 6. FIG. 19 is a graph with load-stroke lines (F-S lines) for cases 1 to 3 for the upright-hat model. FIG. 20 is a graph with load-stroke lines (F-S lines) for cases 4 to 6 for the reversed-hat model. The analysis results in FIG. 19 show that load decreases more slowly for case 3 than for cases 1 and 2. The analysis results in FIG. 20 show that load decreases more slowly for case 6 than for cases 4 and 5. It is presumed that, under the conditions of cases 3 and 6, bending was prevented such that loading continued. This demonstrates that, regardless of whether the upright-hat model or the reversed-hat model is used, impact-energy absorption efficiency will be higher and bending will be smaller if the dimension of the low-strength portion 3s as measured in the longitudinal direction is equal to the height H of the side wall than if it is H/2.

Figure 21:
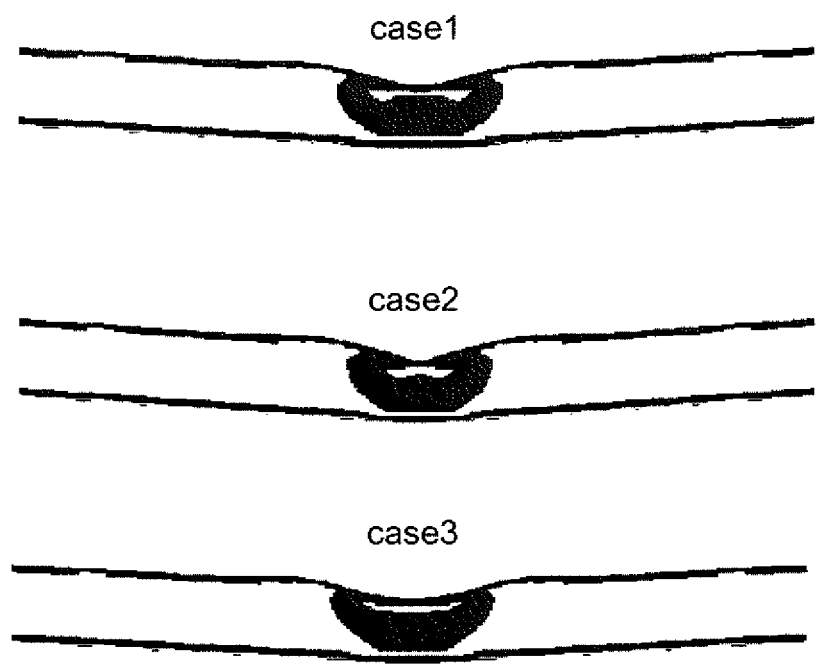
FIG. 21 shows the results of an analysis of the deformation behavior of the upright-hat model.
Figure 22:
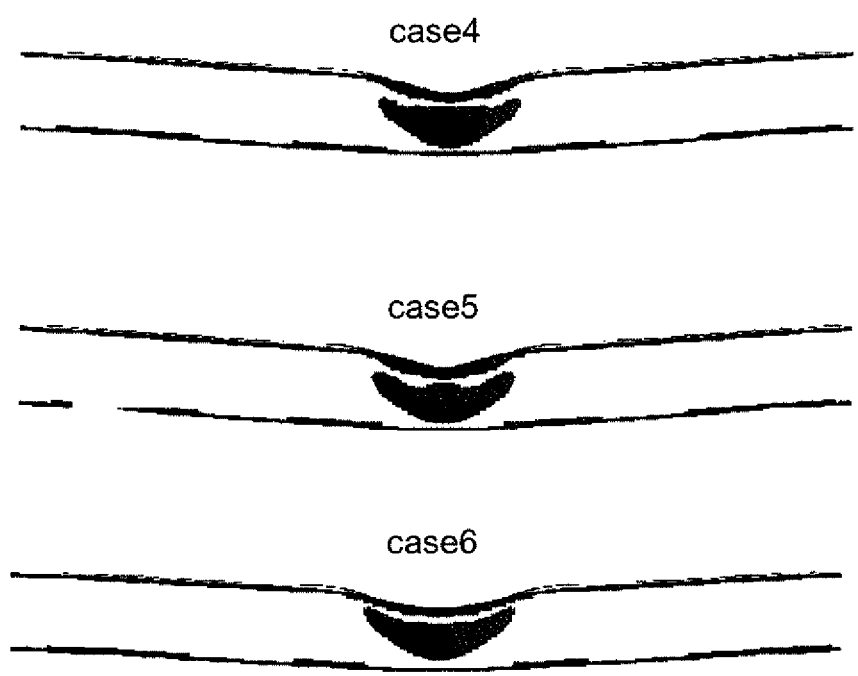
FIG. 22 shows the results of an analysis of the deformation behavior of the reversed-hat model.

FIG. 21 shows the results of analysis of the deformation behavior for cases 1 to 3. FIG. 22 shows the results of analysis of the deformation behavior for cases 4 to 6. FIGS. 21 and 22 show how a structural member is deformed for a stroke of 20 mm. According to the results of analysis for cases 1 to 3 for the upright-hat models shown in FIG. 21, deformation expands in the longitudinal direction and bending is minimized for case 3, where SL=H, than for case 1, where SL=0, and case 2, where SL=H/2. According to the results of analysis for cases 4 to 6 for the upright-hat models shown in FIG. 22, deformation expands in the longitudinal direction and bending is minimized for case 6, where SL=H, than for case 4, where SL=0, and case 5, where SL=H.

Real experiments were conducted where test specimens similar to the structural member shown in FIG. 15 were fabricated and impacts were applied thereto. Each of the test specimens was placed on two stands positioned to be separate in the longitudinal direction of the test specimen, with the closing plate located downward, and an indenter (falling weight) was caused to hit the hat member. The mass of the indenter was 376 kg and the impact velocity of the indenter was 3.9 m/s. Two test specimens, i.e. a structural member with a uniform strength and a structural member with low-strength portions, were fabricated and an impact was applied to each of them by the indenter. Each low-strength portion extended from the edge of the side wall located adjacent to the top-surface portion to a position at a distance Sh as measured in the height direction and extended a distance LS as measured in the longitudinal direction of the side wall. Here, the distance Sh=0.3 H (i.e. 30% of the height H of the side wall) and the distance LS=H (i.e. height H of the side wall).

Figure 23:
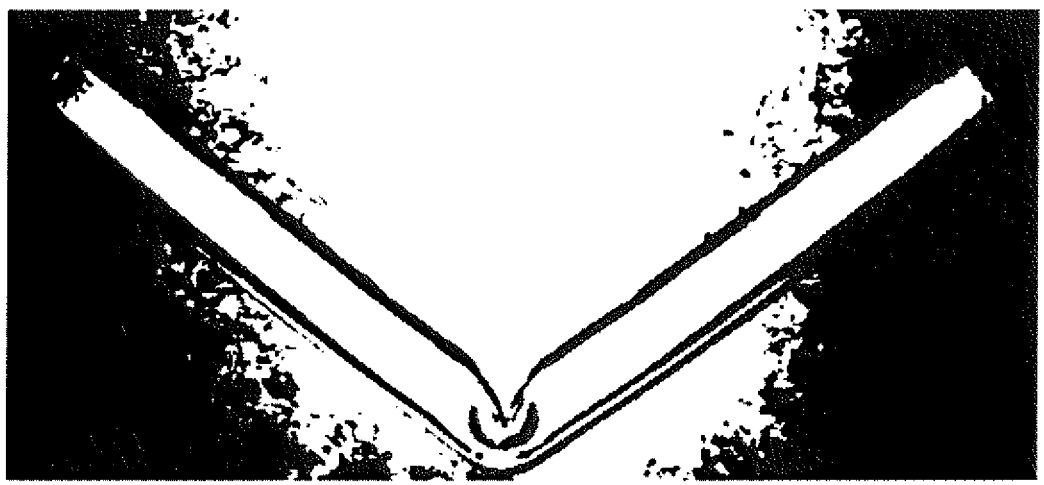
FIG. 23 shows how a test specimen with a uniform strength has deformed.
Figure 24:
FIG. 24 shows how a test specimen with a low-strength portion has deformed.

FIG. 23 shows the result of deformation of the test specimen with a uniform strength. FIG. 24 shows the result of deformation of the test specimen with low-strength portions. The test specimen shown in FIG. 23 was sharply bent. The test specimen shown in FIG. 24 was deformed in a cross-section crush. The extent of deformation due to an impact was smaller in the test specimen with low-strength portions.

Figure 25:
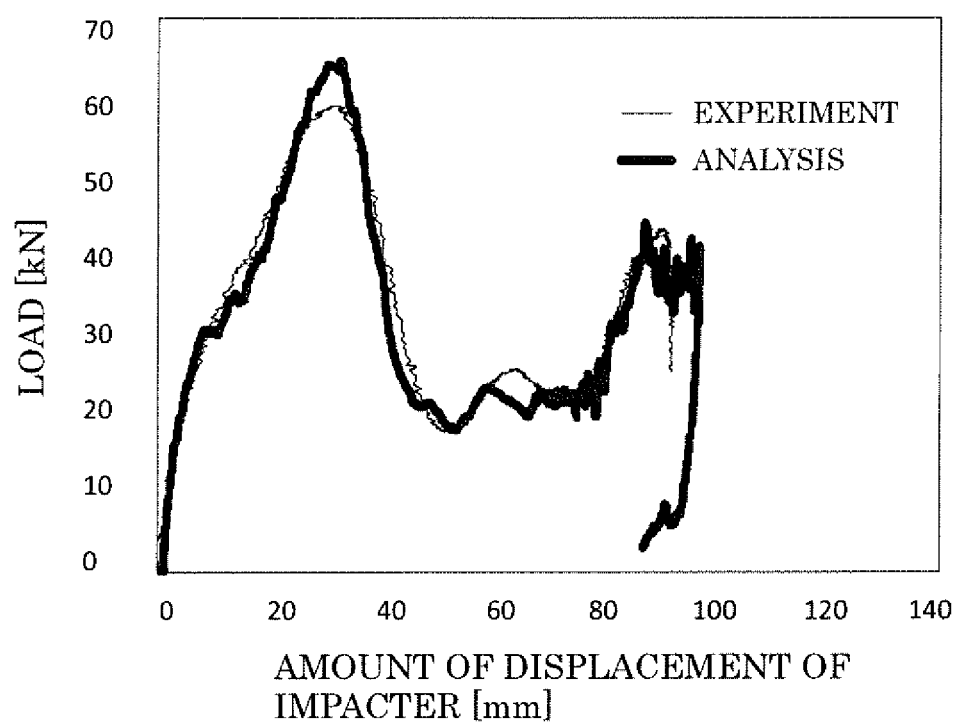
FIG. 25 is a graph showing the results of measurement in impact tests on test specimens and the results of an analysis from simulations using models of the same structural members as the test specimens.

FIG. 25 is a graph of the results of measurement of the impact experiments for test specimen with low-strength portions and the results of analysis by simulations using models of the same structural member as the test specimen. In the graph of FIG. 25, the horizontal axis indicates the amount of displacement (mm) of the impacter (indenter) and the vertical axis indicates load (kN). In the graph, the fine line indicates the experiment results and the thick line indicates the analysis results. The results shown in FIG. 25 demonstrate that the analysis results from the simulations were close to the experiment results.

Although embodiments of the present invention have been described, the above embodiments are merely examples for carrying out the present invention. Thus, the present invention is not limited to the above-described embodiments, and the above-described embodiments may be modified as appropriate without departing from the spirit of the invention.

EXPLANATION OF CHARACTERS

1: hat member
1a: top-surface portion
1b: side walls
1c: flanges
1s: low-strength portions
2: closing plate
10: structural member

The invention claimed is:

1. A structural member comprising:
at least one closing plate; and
a hat member,
the hat member including:
a top-surface portion;
two first ridges on both edges of the top-surface portion;
two flanges joined to the closing plate;
two second ridges on edges of the two flanges; and
two side walls, each side wall located between one of the two first ridges and one of the two second ridges,
each of the two side walls including:
a) a low-strength portion extending from one of the first ridges toward one of the second ridges to a position on the side wall such that the low strength portion in length is 20 to 40% of a distance between the one first ridge and the one second ridge as measured in a direction perpendicular to the top-surface portion, and
b) a high strength portion, the high strength portion having a higher yield strength than the low strength portion, the high strength portion extending from an end portion of the low strength portion on the side wall to the second ridge,
the low-strength portion extending, as determined along a longitudinal direction in which the first ridge extends, a length equal to or larger than the distance between the one first ridge and the one second ridge as measured in the direction perpendicular to the top-surface portion,
the low-strength portion having a yield strength of 60 to 85% of a yield strength of the side wall as measured at a middle of the side wall as determined along the direction perpendicular to the top-surface portion.

2. The structural member according to claim 1, wherein the low-strength portion is located at a middle of the side wall as determined along the longitudinal direction.

3. The structural member according to claim 1, wherein the top-surface portion of the closing plate includes at least two connections spaced apart from each other as determined along the longitudinal direction of the first ridge and connected to another member, and
the low-strength portion is located at a middle of the side wall between the at least two connections as determined along the longitudinal direction of the first ridge.

4. The structural member according to claim 1, wherein, for each of the two side walls, a tensile strength of the side wall as measured at the middle of the side wall as determined along the direction perpendicular to the top-surface portion is 980 MPa or higher.

5. A vehicle comprising the structural member according to claim 1, wherein the structural member is positioned such that the top-surface portion is located outward with respect to the vehicle and the closing plate is located inward with respect to the vehicle.

\* \* \* \* \*